United States Patent [19]

Goodman et al.

[11] Patent Number: 5,402,492
[45] Date of Patent: Mar. 28, 1995

[54] SECURITY SYSTEM FOR A STAND-ALONE COMPUTER

[75] Inventors: Michael K. Goodman, Tustin; Farzad Noorbehesht, Aliso Viejo; Charles F. Raasch, Lake Forrest, all of Calif.

[73] Assignee: AST Research, Inc., Irvine, Calif.

[21] Appl. No.: 79,630

[22] Filed: Jun. 18, 1993

[51] Int. Cl.$^6$ .............................................. H04L 9/32
[52] U.S. Cl. ............................................ 380/25; 380/4
[58] Field of Search .............................. 380/4, 44, 25; 364/252.3, 252.4, 252.7, 958, 958.1, 958.4

[56] References Cited

U.S. PATENT DOCUMENTS

| | | | |
|---|---|---|---|
| 4,942,606 | 7/1990 | Kaiser et al. | 380/4 |
| 5,212,729 | 5/1993 | Schafer | 380/4 |
| 5,222,133 | 6/1993 | Chou et al. | 380/4 |
| 5,265,163 | 11/1993 | Golding et al. | 380/25 |
| 5,297,200 | 3/1994 | Murray | 380/4 |

Primary Examiner—Gilberto Barrón, Jr.
Attorney, Agent, or Firm—Knobbe, Martens, Olson & Bear

[57] ABSTRACT

A security system for stand alone and portable computer hosts which utilizes both a hardware key and a password key to enable-access to the computer host. The entry of the password key and the hardware key is monitored by the keyboard controller. The keyboard controller alters a status bit during the POST portion of the host code if access is granted. The host security is divided into two levels of security, a first administrative level and a second user level. The administrative level is accessible by the entry of a first password or by the hardware key and enables access to all levels of the host SET-UP configuration. The user level is accessible by the entry of a second password and only enables access to a limited portion of the setup configuration.

17 Claims, 16 Drawing Sheets

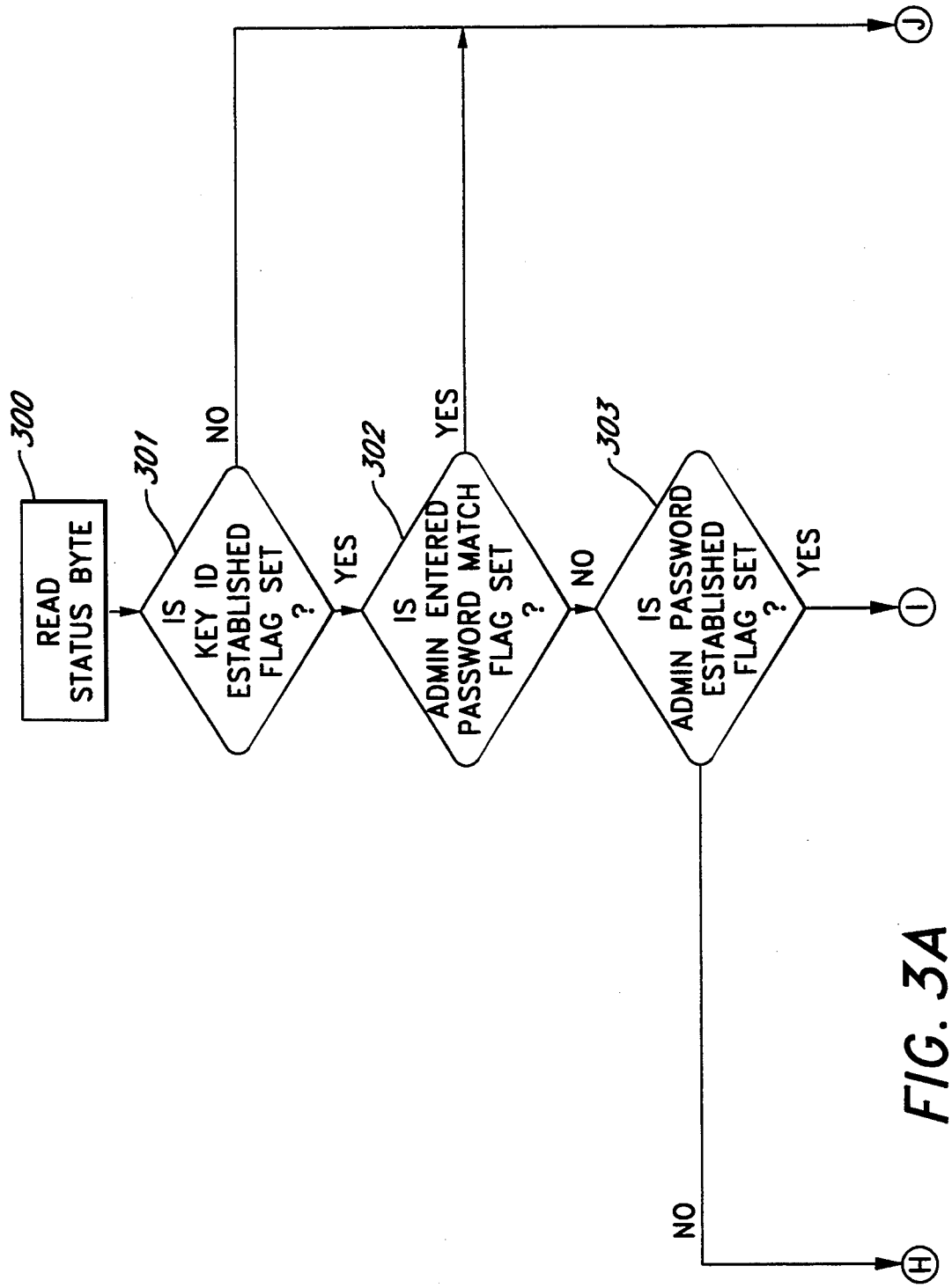

SECURITY SYSTEM FOR A STAND-ALONE COMPUTER

BACKGROUND OF THE INVENTION

1. Field of the Invention

The present invention relates to the field of computer security systems. More particularly, the present invention relates to controlling access to a stand alone or portable computer system using both password entry and a hardware key.

2. Description of the Related Art

Computer security usually relates to a large computer network of a number of users where each user has access to a limited portion of the network. Thus, the security system prevents each user from accessing another user's storage area and from accessing the system control portion of the network. This limited access maintains the integrity of the network, but is usually not required in a stand alone system.

Another area where security has become prevalent is in the area of computer software. In certain circumstances, in order to run a software program, a hardware key must be installed in one of the serial ports of the computer. The key prevents users from copying software. The keys are usually active keys which are designed to be difficult to decode to prevent a user from being able to reproduce the key device.

Development in the area of computer security at the stand alone computer level or for portable computer systems has been limited. Examples of security that is provided on a stand alone computer include systems such as the IBM AT, which has a mechanical lock and key system. A mechanical key is matched to a mechanical lock which enables the rotation of a lock from one position to another position. The lock must be in the on position to enable the stand alone system to operate. Mechanical lock systems are primitive, and can be easily defeated. Another example of computer security is a password which the operating system requires during each boot sequence. Most portable computer systems today do not have any security system. The small size of the portable computer and lack of security has made portable computers an attractive target for thieves.

SUMMARY OF THE INVENTION

The present invention is a security device for computer systems. The security system of the present invention utilizes a hardware key and a password to enable access to the computer system. A keyboard controller manages the system security. The security system is, therefore, transparent to the operating system, making it more secure from access by a fraudulent user who wishes to intercept the security communications.

The security system is divided into two levels of password security, a first administrative level and a second user level. The hardware key overrides all system security. The administrative level is accessible by the entry of a first password. The administrative level of access enables the modification of all of the parameters of the system setup program. The user level is accessible by the entry of a second password, and only enables access to certain portions of the system setup program. By enabling two separate levels of security, a system administrator can control the access to certain system level configuration options while still allowing users to access all other operational portions of the system. Further, if the administrator or user forgets a password, the hardware key can be used to override all system security.

The entry of a password is monitored by the keyboard controller during system start-up. The keyboard controller compares the password to a previously stored password value. The keyboard controller sends the operating system "go" or "no go" status bits during the Power On Self Test (POST) portion of the boot operation. The status bits correspond to the administrative level or user level code depending on whether the password is correct. A status bit is also sent indicating whether override hardware key is installed. To access the computer using the electronic hardware key, the key is inserted into a mouse port such as a PS/2[1] ® port (or any port which is controlled by a non-system level microcontroller) which is controlled by the keyboard controller. An ID value stored in the key is read from the key and compared to a stored key ID value by the keyboard controller. The system provides for the storage of at least two password values and one hardware key value, each of which, if properly matched, enables access to the computer system.

[1] PS/2 is a registered trademark of IBM Corporation.

One aspect of the present invention involves a security system for controlling access to a host computer. The security system monitors a set of security settings during system boot operations and controls access to the host computer based upon the security settings. The security system has at least one peripheral device communications port and a key which is adapted for connection to the communications port. The key has an associated key ID value stored therein. The security system executes with a microprocessor-based peripheral controller which is in communication with a non-volatile memory, a keyboard, the communications port and the host computer. The non-volatile memory has defined therein a stored key ID value and a first password value. The stored key ID value corresponds to the key ID value in the key and the first password value corresponds to a selected first access password. The microprocessor-based peripheral controller responds to either the key being connected to the communications port or entry of the first access password on the keyboard to permit access to the host computer.

In one embodiment, the non-volatile memory has further defined therein a second password value which corresponds to a selected second access password. In this embodiment, the peripheral controller is further responsive to entry of the second access password on the keyboard to permit access to less than all of a set of setup parameters for said host computer. The communications port, in one embodiment, comprises a PS/2 ®-type mouse port, and the key comprises an electronic key having a second non-volatile memory containing the key ID value. In the present embodiment, the second non-volatile memory of the key operates based on a one-wire data communication protocol and has only one data line and one ground line.

Another aspect of the present invention involves a method of controlling access to a host computer. The host computer is in communication with the peripheral device controller, and the peripheral device controller is in communication with at least one communications port and with a first non-volatile memory. The non-volatile memory has defined therein a stored key ID value corresponding to a key ID value in an access key. The method follows the steps of coupling a key having a key ID value corresponding to the stored key ID value to the communications port, reading, with the peripheral controller, the key ID value from the key, comparing, with the peripheral controller, the key ID value to the stored key ID value, and permitting access to the host computer if the peripheral controller determines that the stored key ID value and the key ID value correspond. In one embodiment, the non-volatile memory has further defined therein a first password value which corresponds to a first access password. In this embodiment, the method further involves the steps of monitoring entries made on a keyboard until a designated on the keyboard is pressed, comparing the entries monitored by the keyboard controller to the first password value to determine if the entries correspond to the first access password, and permitting access to the host computer if the entries correspond to the first access password. In a further embodiment, the non-volatile memory has further defined therein a second password value corresponding to a second access password. In this further embodiment, the method further involves the steps of comparing the entries monitored by the keyboard controller to the second password value to determine if the entries correspond to the second access password, and permitting access to less than all of the set of setup parameters for the host computer if the entries correspond to the second access password.

BRIEF DESCRIPTION OF THE DRAWINGS

FIGS. 3A-3B depict a flowchart which details operating system level operations of the security system of the present invention during system boot operations.

DETAILED DESCRIPTION OF THE PREFERRED EMBODIMENTS

The present invention is a security system for computer systems. The security system utilizes both an electronic hardware key and passwords to enable access to the computer system. The security system is transparent to the operating system during runtime, so it is not accessible by a fraudulent user who wishes to intercept the security communications.

Figure 1:
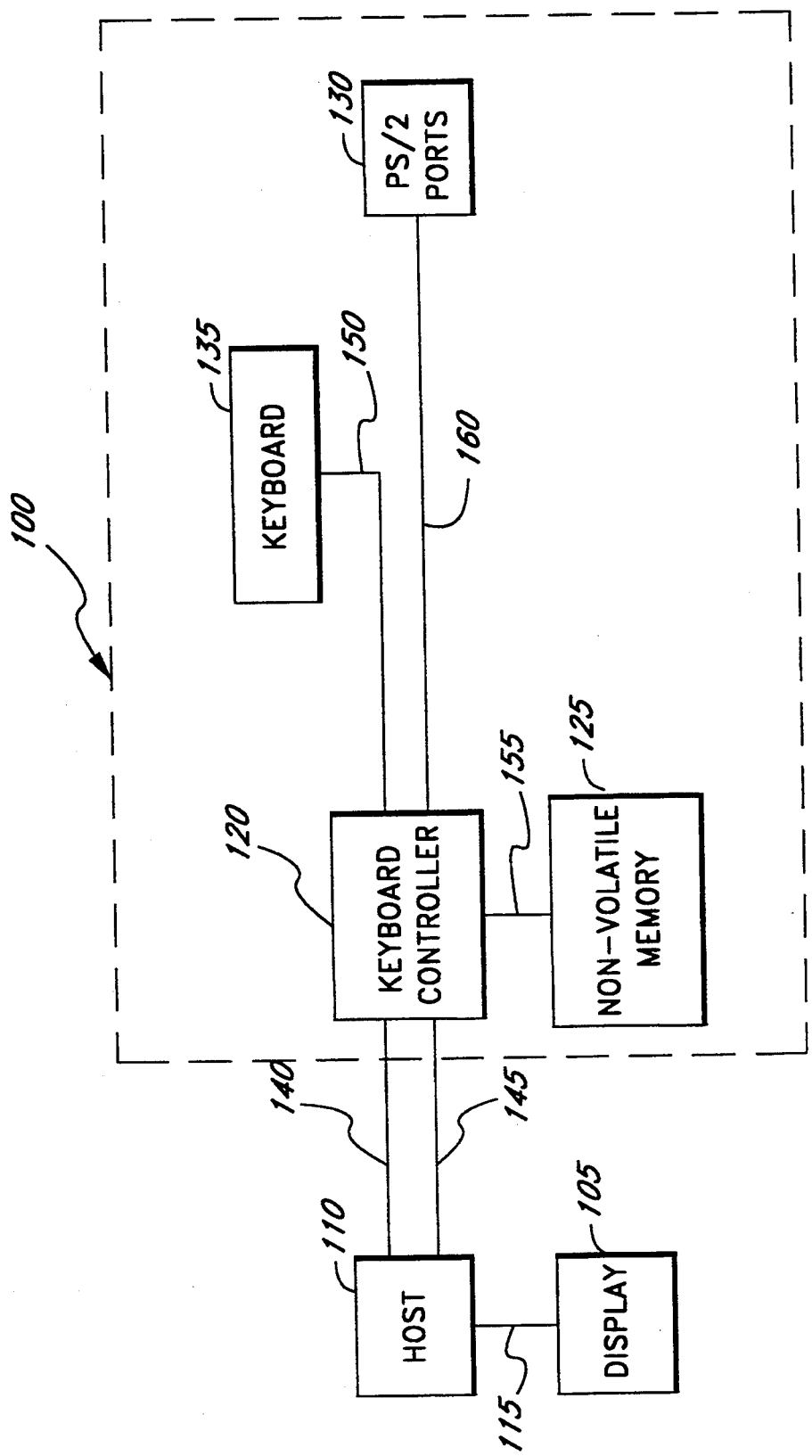
FIG. 1 is a block diagram of a computer system which includes the security system of the present invention.

FIG. 1 is a block diagram of the security system 100 and its interface with the host computer 110. The host 110 may, for instance, be an IBM compatible computer based on INTEL 80×86 architecture. FIG. 1 further illustrates a display terminal 105 connected to the host 110 via signal lines 115. The security system 100 comprises a keyboard controller 120, a non-volatile memory 125, at least one PS/2 ® type mouse port 130 and a keyboard 135. The keyboard controller 120 controls the operations of the security system and communicates with the operating system of the host 110 via signal lines 140. In one embodiment, the keyboard controller 120 has a display blanking port which connects to the host computer 110 via a signal line 145. As is well known in the art, the display blanking port is used to blank the display 105. The signal lines 140 comprise an input/output bus between the host 110 and the keyboard controller 120. The keyboard controller 120 is in communication with a keyboard 135 via signal lines 150, and with the non-volatile memory 125, via signal lines 155. Additionally, the keyboard controller is in communication with the at least one PS/2 ®-type mouse port 130 (or any other port which is in communication with the keyboard controller) via signal lines 160. The keyboard controller 120 is advantageously a microprocessor-based controller, such as AST ® Research, Inc.'s Miki controller, or an Intel ® 80C51SL-AG, 8742, 8042, or similar microprocessor-based keyboard controller. As is well-known in the art, the keyboard controller 120 provides an interface between the host 110 and the peripheral input devices such as the keyboard 135 and devices connected through the PS/2 ®-type ports 130.

Figure 2:
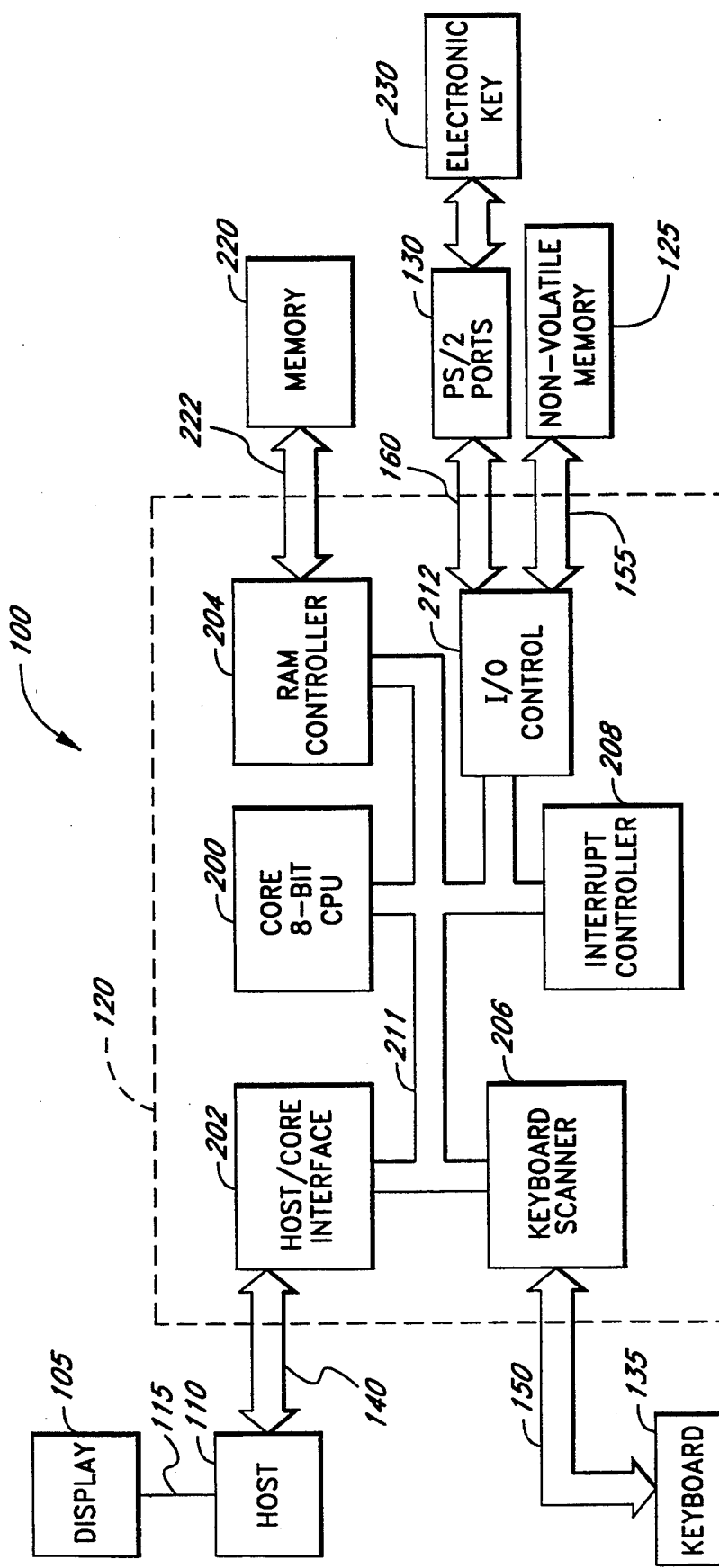
FIG. 2 is a block diagram of the security system of the present invention.

FIG. 2 is a more detailed block diagram of the security system 100 with the specific control elements of keyboard controller 120 shown in more detail. The keyboard controller 120 comprises a core 8-bit central processing unit CPU 200, a host/core interface 202, a RAM Controller 204, a keyboard scanner 206, an interrupt controller 208 and I/O control logic 212, all of which communicate via an internal bus 214. The core 8-bit CPU 200, such as an Intel 8031 or 8051 controller, controls the operation of the keyboard and its associated functions. The host/core interface, as is well known in the art, is used to control the communications between the host processor 110 and the keyboard controller 120. The keyboard scanner 206 scans the keyboard 135 and calculates the scan codes for the keys which have been depressed on the keyboard 135. The interrupt controller 208 receives and processes the interrupts for the core 8-bit CPU 200. The I/O control logic 212 controls the communications between the core 8-bit CPU 200 and the at least one PS/2 ®-type port 130 via lines 160 and the non-volatile memory 125 via lines 155.

The RAM controller 204 is further connected to a memory 220 (preferably, a static memory) via signal lines 222. Although the memory 220 is shown in FIG. 2 as being external to the keyboard controller 120, it should be understood that the memory 220 may also be internal to the keyboard controller 120.

In operation, the keyboard controller 120 performs a number of pre-programmed procedures which relate to the interaction between the host system 110 and the keyboard 135. Additionally, the keyboard controller 120 controls the interaction between other peripherals which are connected to the system via the PS/2® ports 130, such as a mouse, a keypad, and the electronic hardware key 230 of the present invention. Instructions for the keyboard controller's operation may be downloaded from the host 110, or may be pre-programmed within the memory 220. In one embodiment, the keyboard controller 120 executes the instructions in response to an interrupt generated by the keyboard 135 or the peripheral devices connected to PS/2® ports 130. The general method used by the keyboard controller 120 to provide security for access to the host 110 is described in more detail below.

The security system 100 is controlled by the keyboard controller 120 and is initiated during the Power On Self Test (POST) portion of the system boot operations. The system boot operations, as is well known in the art, are controlled by the system BIOS. All of the boot operations must be completed before runtime control by the operating system of the host 110 begins. One way to access the secured system is by matching a 48-bit number that is stored in the hardware key 230, referred to as a key ID, to a stored key ID value. This hardware key 230 functions as a security system override. Another way to access the secured system is to enter one of at least two stored passwords using the keyboard 135. The stored key ID value and passwords are maintained in the non-volatile memory 125, such as an E²PROM, access to which is controlled by the keyboard controller 120.

The security system 100 of the present invention is divided into two levels of security, a first administrative level, or admin level, and a second user level. The administrative level is accessible by the entry of a first password, referred to as an admin password. In addition, this level is accessible by the installation of the hardware key 130 into the PS/2® port 130 which overrides all security. The administrative level enables access to all of the system setup commands and to all of the operational portions of the host system. The user level is accessible by the entry of a second password, referred to as a user password, and enables access to all of the operational portions of the host, but only enables access to a certain portion of the system setup commands. In a preferred embodiment, a third password, also referred to as a user password, enables access to the user level. In the two-user password embodiment, each of the user passwords are differentiated as user1 and user2 passwords. By enabling two separate levels (i.e., admin and user) of security, a system administrator can control the access to certain system level configuration commands while still enabling the user to access other operational portions of the host system.

If an administrative level access has been enabled, the user will be enabled access all parameters during setup operation.

In one embodiment, if a user level access has been enabled, the user will not have access to certain parameters which the administrator can access in the setup operation. For instance, the security panel in the setup operations may appear as follows for admin level access:

```
Security Panel:
   <OVERVIEW>
   SMARTKEYID                                        <Clear, Establish>
PASSWORD
   ADMIN SECURITY                                    <Enabled, Disabled>
      ENTER PASSWORD:[********]
      VERIFY the PASSWORD:[********]
   USER SECURITY                                     <Enabled, Disabled>
      ENTER PASSWORD:[********]
      VERIFY the PASSWORD:[********]
   LOCK KEYBOARD                                     <Disabled, 5min...30min>
   PASSWORD AT BOOT                                  <Inhibited, Enable, Disable>
   <EXIT TO MAIN MENU>
```

And the same security panel may appear as follows for user level access:

```
Security Panel
   <OVERVIEW>
PASSWORD
   USER SECURITY                                     <Enabled, Disabled>
      ENTER PASSWORD:[********]
      VERIFY the PASSWORD:[********]
   <EXIT TO MAIN MENU>
```

Other differences may also be advantageous:

```
Admin Level:
   Update BIOS
   <OVERVIEW>
REVISION
   BIOS                                              xx.yy.zz
   Battery Controller                                xx.yy.zz
   BIOS Loader                                       xx.yy.zz
BIOS UPDATE
   <SAVE CHANGES, EXIT, AND UPDATE BIOS>
   <EXIT WITHOUT SAVING CHANGES, AND UPDATE BIOS>
   <EXIT TO MAIN MENU>
   USER LEVEL:
      Update BIOS
   <OVERVIEW>
REVISION
   BIOS                                              xx.yy.zz
   Battery Controller                                xx.yy.zz
   BIOS Loader                                       xx.yy.zz
   <EXIT TO MAIN MENU>
```

-continued

```
Admin Level:
        SETUP Main Menu
    <OVERVIEW>
Date and Time
    Date (MM/DD/YY)                                     [01/01/80]
    Time (HH:MM:SS)                                     [00:00:00]
    <Power Management>
    <System Configuration>
    <Security>
    <Update BIOS>
    <Exit System Setup>
User Level:
        SETUP Main Menu
    <OVERVIEW>
Date and Time
    Date (MM/DD/YY)                                     [01/01/80]
    Time (HH:MM:SS)                                     [00:00:00]
    <Power Management>
    <System Configuration>
    <Security>
    <Update BIOS>
    <Exit System Setup>
Admin Level:
        Power Management Panel
        This panel allows one mutually exclusive choice. The
options are presented this columnar way in order to give each
one its own context sensitive help panel on the right of the
display.
    <OVERVIEW>
    Power Management              <Max Battery Life, Max Performance>
    Characterize Battery                          <Enable, Disable>
    System Suspend Options
        Smart Sleep                          <No Delay, 0.5hr, 1hr, 2hr,
                                                    3hr, 4hr, 5hr>
        Resume On Modem Ring                  <Enable, Disable>
        Resume On Schedule                    <Enable, Disable>
            Time                                      [00:00:00]
            Date                                      [00/00/00]
    <Exit to Main Menu>
User Level:
        Power Management Panel
        This panel allows one mutually exclusive choice. The
options are presented this columnar way in order to give each
one its own context sensitive help panel on the right of the
display.
    <OVERVIEW>
    Power Management              <Max Battery Life, Max Performance>
    System Suspend Options
        Resume On Modem Ring                   <Enable, Disable>
        Resume On Schedule                     <Enable, Disable>
            Time                                      [00:00:00]
            Date                                      [00/00/00]
    <Exit to Main Menu>
Admin Level:
        System Configuration Panel
    <OVERVIEW>
BOOT OPTIONS
    Mouse Connected To                       <None, Serial 1, Serial 2,
                                                    Key Pad Port>
    Parallel Port Type                <Disable, Standard, Enhanced>
    Boot Device                  <Try Floppy First, Try Hard Drive
                                       Only, Try PowerStation>
    Speaker                      <Enable, Warnings Only, Disable>
    Keyboard Clicks                              <Enable, Disable>
    Font Expand                                  <Enable, Disable>
    Simultaneous Video                           <Enable, Disable>
    Serial Ports                               <Port 1, 2 Disabled>
                                     <Port 1 = 3F8h, 2 Disabled>
                                     <Port 1 = 3F8h, Port 2 = 2F8h>
MEMORY
    Modify Refresh Rate                          <Enable, Disable>
PowerStation Options
    Floppy Drive B                                         <None>
                                                      <1.44 MB 3.5">
                                                      <720 KB 3.5">
                                                      <1.2 MB 5.25">
                                                      <360 KB 5.25">
    Ext Video Adapter                            <Enable, Disable>
    <Exit to Main Menu>
User Level:
        System Configuration Panel
    <OVERVIEW>
```

| BOOT OPTIONS | |
|---|---|
| Speaker | <Enable, Warnings Only, Disable> |
| Keyboard Clicks | <Enable, Disable> |
| Font Expand | <Enable, Disable> |
| Simultaneous Video | <Enable, Disable> |

Of course, other variations can be implemented depending upon security concerns.

An advantage of the security system of the present invention is that it enables access to the administrative level of the security system by overriding all security with the hardware key 230. Thus, if the admin password is lost or forgotten, access is still possible via the hardware key 230. Advantageously, the security system of the present invention provides a secure system and yet provides at least one backup form of entry. This system also provides the advantage of allowing a system administrator to use the same electronic hardware key 230 for all, or a selected group, of computers over which the administrator has responsibility.

The hardware key 230 is a passive device and is preferably made from a ROM. The memory on the key 230 contains a unique multi-bit key ID value. The ROM in the key 230 is connected to a standard PS/2® port male connector. Preferably the ROM is a DS2400 silicon ROM produced by Dallas semiconductor. Because the hardware key 230 is a passive device, the ROM of the key 230 obtains its operational power from the host system's power supply when it is inserted into the PS/2® port 130 (female connector). Preferably, the ROM does not require a power supply connection line from the host system to the hardware key 230 because the ROM obtains power from a single data line from the PS/2® port 130. Therefore, the ROM only has a single data line and a single ground line for communication with the computer. Before shipment, the ROM is programmed by the manufacturer with a unique 48-bit number, thus enabling the formation of billions of different key ID values.

In use, the hardware key 230 is inserted into one of the PS/2® ports 130 on the host computer 110. The use of a PS/2® port 130 is advantageous because the PS/2® port 130 is monitored only by the keyboard controller 120. Since the host processor 110 does not have access to communications with the PS/2® port 130, the communications between the hardware key 230 and the keyboard controller 120 are secured from access by the operating system. Further, the only communication which occurs between the hardware key 230 and the keyboard controller 120 occurs during the operation of the system boot code or the setup program. During the system boot and setup program operation, access to the operating system of the host 110 is not yet granted to the user which further inhibits access to the security system.

The only information that the system BIOS and the setup program obtain from the security system 100 is the status of the system. The security system status is obtained by transferring the security status byte from the security system 100 to the host system 110. The security status byte contains information on the condition of the following flags: an admin level password established flag, a user password established flag, an admin entered password match flag, a user entered password match flag and a key ID established flag. The admin password established flag indicates that an admin level password has been established for the security system. The user level password established flag indicates that a user level password has been established for the security system. The admin entered password match flag indicates that either the hardware electronic key has been connected to the PS/2® port and matches a stored key ID, or that the admin level password has been entered by the administrator and matches the stored admin level password. The user entered password match flag indicates that a user level password has been entered and matches the value established for the security system. The key ID exists flag indicates that the key ID value from the electronic hardware key 230 is stored in the non-volatile memory 125 (e.g., the E$^2$-PROM). The use of the these flags will become more apparent upon discussion of the security system operations below. By transferring the status byte to the host 100, the security system informs the host system 110 of the status of the security system without requiring that the host system 100 actually access the associated hardware of the security system 100.

Many keyboard controllers 120 prevent access to the keyboard controller program memory by the host (known as lockout) except during a system boot and setup operations. Lockout is typically activated during the POST code and during other boot operations. As explained in further detail below, lockout adds integrity to the security system because the host will not have access to the keyboard controller 120 to disable security once the lockout feature is active.

Further, the keyboard controller 120 performs the security commands during a system boot and during the setup program at which point general user access to the operating system has not been granted. Access to the security commands during these allowable time periods is also only enabled when an administrative level of access has been granted either via the hardware key 230 or by the entry of the admin password.

In a preferred embodiment of the present invention, the security system is activated by the user before the security features are functional. Upon first use of the system, features of the security system are initialized by initializing the hardware key 230 as the security system override access key for the system. This is accomplished during system set-up operations. First, the user selects the establish key ID command ("SMART KEY ID" in the present embodiment) from the system setup menu and then inserts a hardware key 230 into a PS/2® port 130. As described in more detail below, the establish key ID command causes the keyboard controller 120 to read the key ID from the hardware key 230 and store it in the non-volatile memory 125. Once the key ID is established, the key ID established flag in the security status byte is set. Once the security system is initialized, the user may create an admin password and a user password. Advantageously, the passwords are not created until the key ID is established to ensure that a backup method of entry besides password entry exists. Further, in the present embodiment, the admin level password cannot be created without a valid key 230 established and present in the PS/2® port 130 and a user level password cannot be created without an administrative level access already existing. Desirably, once security is initialized, the administrative level can be accessed via a password or via the electronic hardware key 230 which overrides security.

The administrative level of access overrides the user level in the present embodiment. For example, if the user forgets a user password, the administrator can access the administrative level of security and delete the user password using the setup commands and enable the user to generate a new user level password. Therefore, the security system of the present invention is advantageous because at each level of access there is a backup method of access to provide a fail-safe system, yet still provide a secure system. In a preferred embodiment, up to two user passwords can be established. Therefore, the same system can be accessed by up to three different users, one admin level user and two user level users, while still maintaining a system which is secure from access by all others.

The flowcharts of FIGS. 3-11 illustrate the method employed by the present invention to provide an improved computer security system. The security system instructions to carry out the operations in the keyboard controller 12 are stored in the memory 220. With the exception of the operations illustrated in FIGS. 3A-3B, the security system operates independent of the host operating system. FIGS. 3A-3B represent operations by the host 110 during POST executing. FIGS. 4-7 illustrate the security operations which are executed during the system boot operations. FIGS. 8-11 illustrate the security operations which are activated by the security commands in the setup program.

Figure 3B:
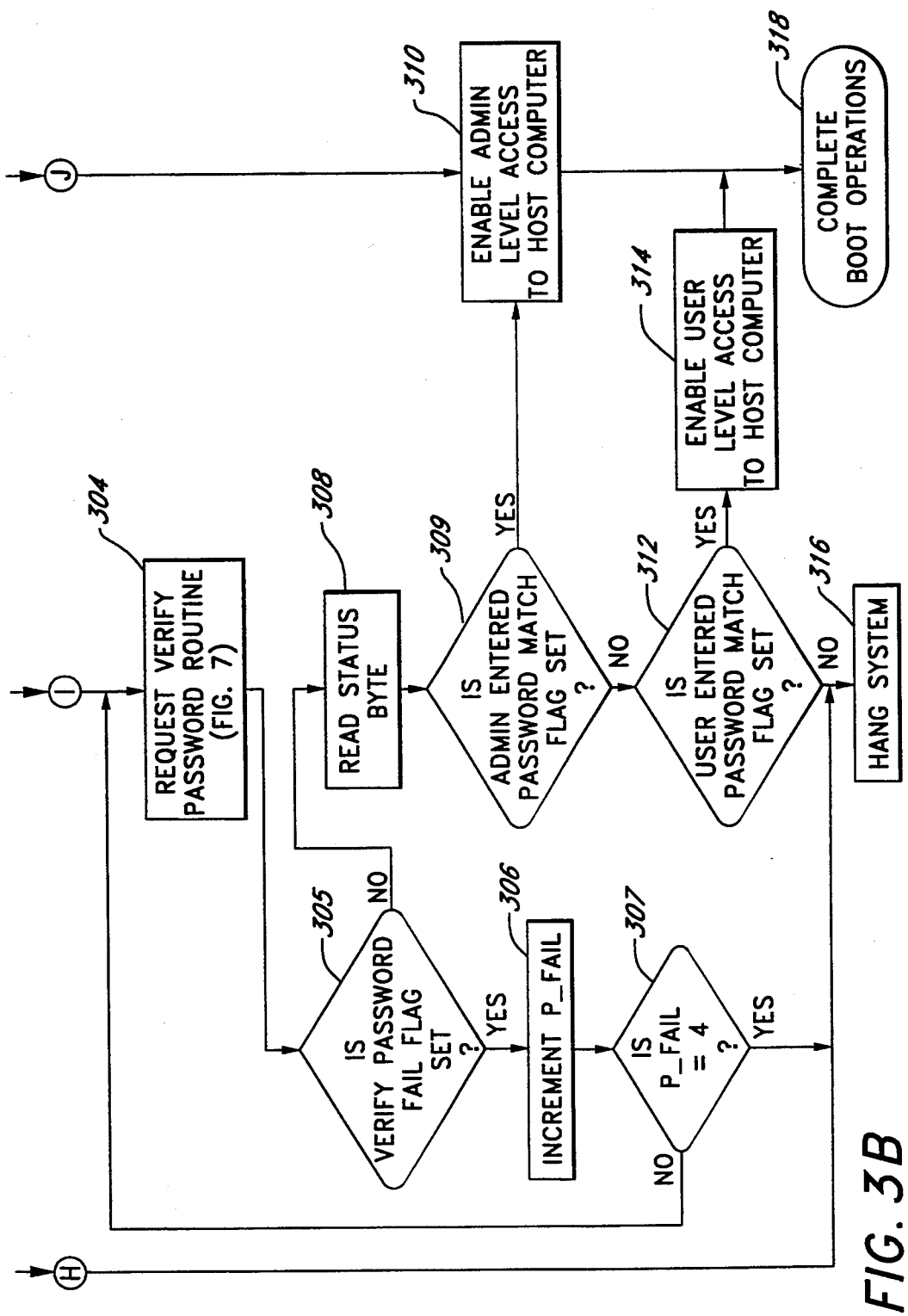

FIGS. 3A-3B illustrate the main security operations which are performed by the host 110 during system startup. Prior to the hosts operations, the security system is initialized within the keyboard controller 120 which performs the initialize security system routine illustrated in more detail in FIGS. 4A-4C. The initialize security system routine executes at each time the computer is reset. In general, in the initialize security system routine, the keyboard controller 120 determines which features of the security system have been established by the user and verifies that the stored values for the hardware key 230 and the passwords have not been altered from their previously stored values. At boot during the initialize security system routine, the keyboard controller 120 reads the non-volatile memory 125 (e.g., the E²PROM) and sets the bits in the security status byte accordingly. If an admin password exists and the electronic hardware key 230 has been established, the keyboard controller polls the PS/2 ® ports 130. If the electronic hardware key 230 is attached to the PS/2 ® port 130 and the key ID in the hardware key 230 matches the stored key ID (in the non-volatile memory 125), the keyboard controller 120 sets the admin entered password match flag and the key ID established flag in the security status byte. If the hardware key 230 is not attached or does not match the stored key ID value, the keyboard controller sets the key ID established flag in the security status byte but does not set the admin entered password match flag in the security status byte. If a key is installed, and the key ID in the key 230 does not match the stored key ID, the routine returns without setting the admin entered password match flag. The initialize system security routine will be described in additional detail below.

After the keyboard controller 120 has executed the initialize system security routine, the host 110 requests certain security information from the keyboard controller 120, which the host 110 receives in the form of the security status byte explained above. This is represented in an action block 300. The host 110 then proceeds to determine the security status. The host first determines if the key ID established flag is set, as is represented in a decision block 301. If this flag is set, a key ID has been established and is present in the non-volatile memory 125, and control proceeds to a decision block 302. If the key established flag is not set, that indicates that no security is present on the computer (i.e., no passwords or key values are stored in the non-volatile memory 125), and control proceeds to an action block 310 (FIG. 3B, via connection block J), where the host allows unrestricted access to the host computer. If the host 110 determines that the key ID established flag is set (decision block 301), indicating that security is established on the system, the host 110 determines if the admin entered password match flag is set (decision block 302). This flag being set indicates that the key is installed and matched the stored key ID. In such a case, the host proceeds to an action block 310 (FIG. 3B, via connection block J) where it allows unrestricted access to the host computer. If, however, at the decision block 302, the host determines that the admin entered password match flag is not set, that indicates that either a key was not attached to the back of the computer PS/2 ® port 130, or the key ID did not match the stored key ID. Control passes to the decision block 303, and the host determines if an admin password has been established. If the admin password established flag is not set, control proceeds to an action block 316 (FIG. 3B, via connection block H), and access to the host computer is inhibited. This is because if the key ID has been established (decision block 301), but the correct key is not installed (decision block 302), and if there is no admin password established, then no access is allowed. In the present system, no user passwords can be established without an admin password being established.

If at the decision block 303, the host 110 determines that an admin password has been established, control passes to the request verify password routine block 304 (FIG. 3B, via connection block I). At process block 304, the host 110 sends a command to the keyboard controller 120. The keyboard controller 120 then executes the verify password routine, which is illustrated in more detail in FIG. 7. In general, during the verify password routine, the keyboard controller 120 reads keystrokes from the keyboard and stores them in a password buffer. The value stored in the password buffer is compared to a stored admin password value and then to a stored user password value. If the password buffer matches the admin password value, then the admin entered password match flag is set, and a user entered password match flag is cleared. If the password buffer matches the stored user password value, the user entered password match flag is set, and the admin entered password match flag is cleared. If the password buffer does not match either the stored admin password or the stored user password, the routine returns with a password verify fail flag set and the user is allowed a total of four attempts to match any of the established passwords. If, after the fourth try, the user password and the admin password have not been matched by the keystrokes of the user, then the user is not allowed access to the system.

After the verify password routine is complete, and the host 110 receives a "passed" status, the routine returns a verify password fail flag. At decision block 305, the verify password fail flag is checked. If the verify password fail flag is not set, the user entered a valid password and control passes to process block 308. If the verify password fail flag is set, the user did not enter a valid password and control passes to process block 306. At process block 306, the password failure counter, referred to as P_FAIL, is incremented in order to keep track of the number of times a failed password has been entered by the user. At decision block 307, the host determines if the P_FAIL counter is equal to four, thus indicating that the user has entered four incorrect password attempts in a row. If the P_FAIL counter is equal to four, control passes to process block 316. At process block 316, the system hangs, thus preventing access to the user. If the P_FAIL counter is not yet equal to four, control passes back to process block 304 where the verify password routine is once again called to enable the user another chance at entering a password value.

Once a valid password has been entered and the verify password routine returns with a "passed" status, the host again reads the status byte, as represented in an action block 308. Program control proceeds to a decision block 309. At decision block 309, the host 110 determines whether the admin entered password match flag has been set. If the admin entered password match flag is not set, the host 110 proceeds to decision block 312. If the admin entered password match flag is set, a valid admin password was entered by the user, and the program proceeds to the process block 310. At process block 310, the host 110 enables access to all the features which are at the administrative access level and the security routine is complete. Control passes to a continue block 318, representing that the host completes boot operations.

At decision block 312, the host 110 system BIOS determines if the user entered password match flag has been set. If the user entered password match flag is not set, the program proceeds to an action block 316 and the system hangs without enabling the user to access the system. If the user entered password match flag is set, then the program proceeds to process block 314. At process block 314, the host 110 enables access to all the features which are at the user access level, and the host 110 continues boot operations as represented by an action block 318.

Figure 4A:
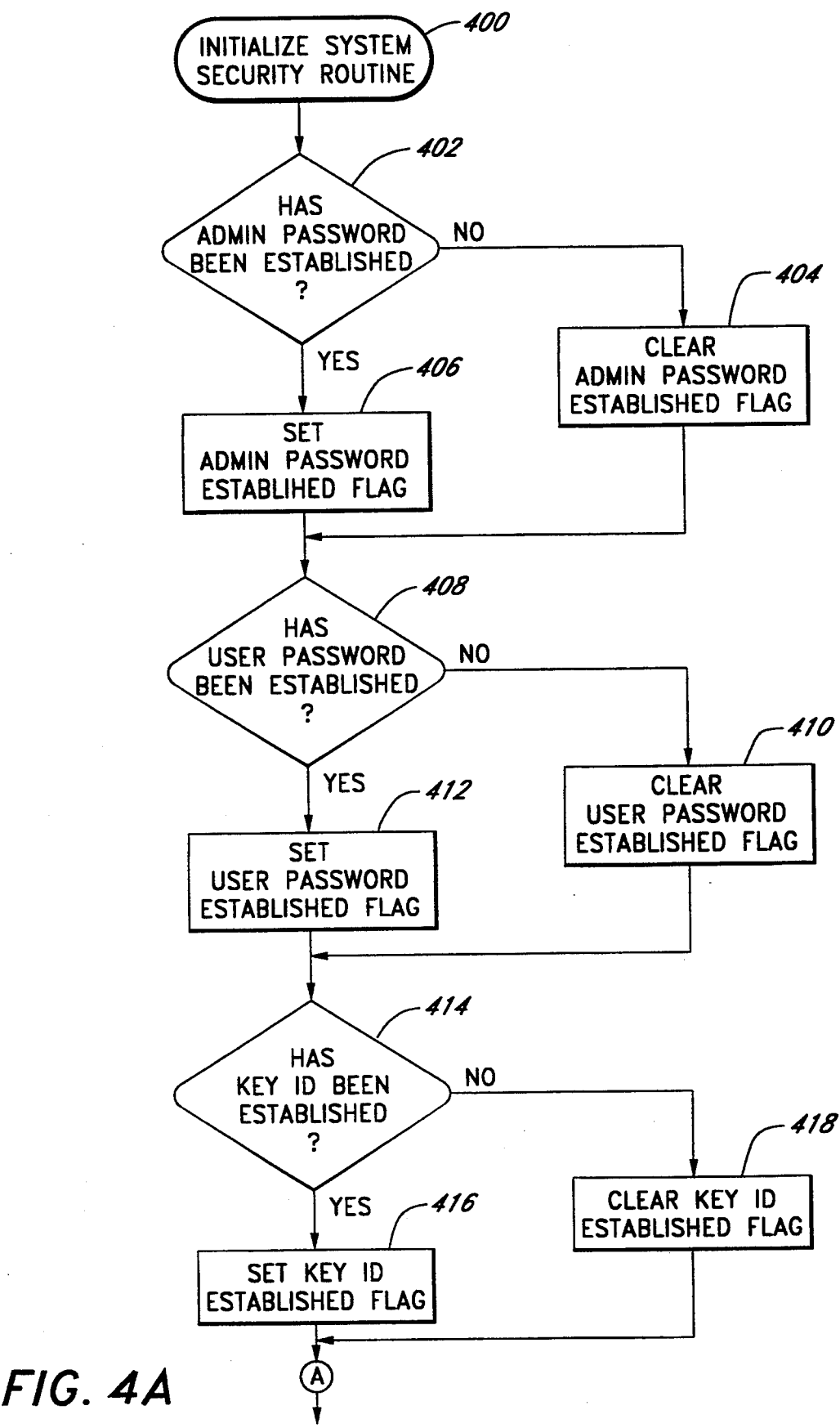
FIGS. 4A-4C depict a flowchart which details the general method employed within an initialize system security routine.
Figure 4B:
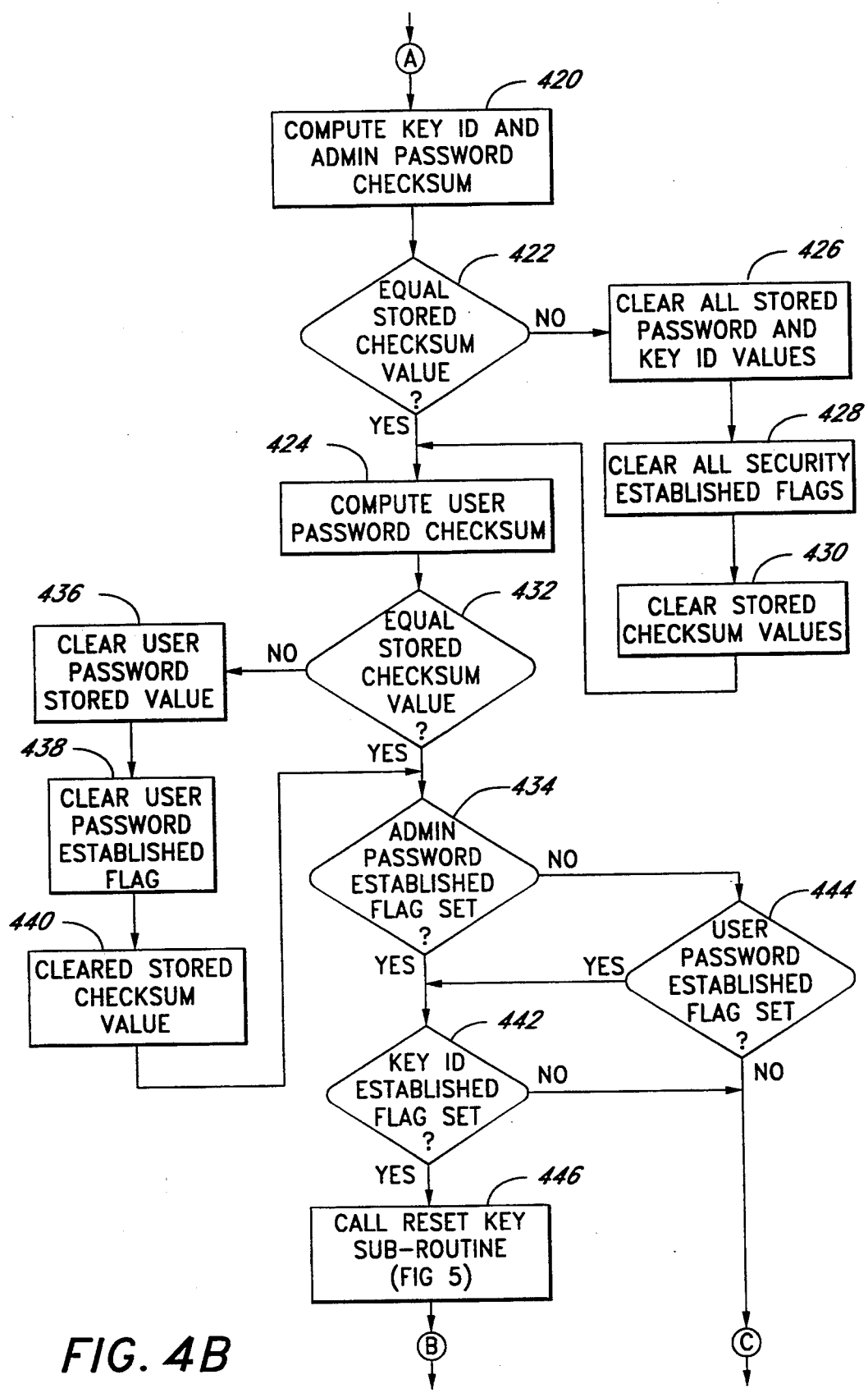
Figure 4C:
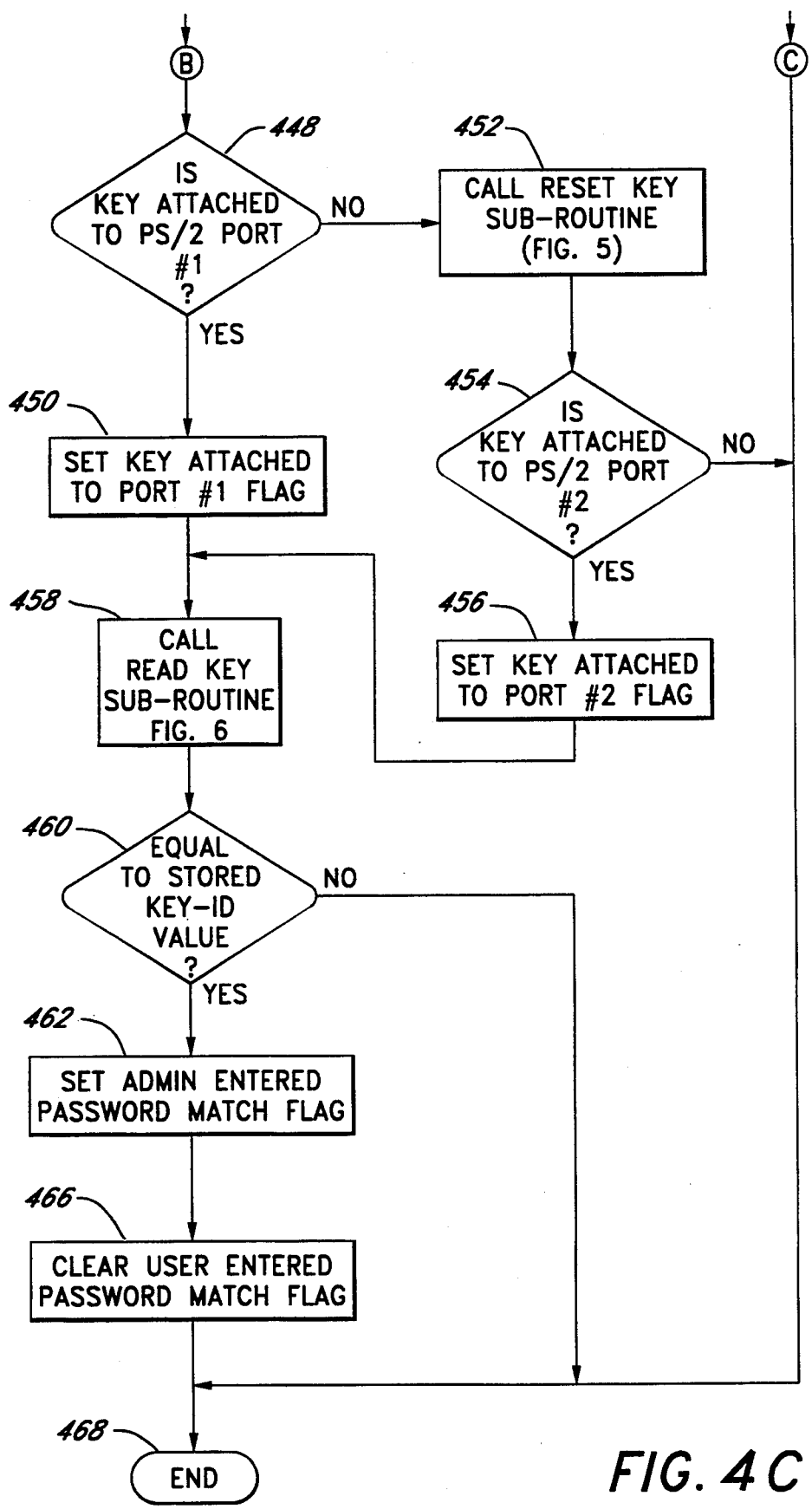

FIGS. 4A–4C illustrate the initialize system security routine which begins at start block 400. As explained above, this routine is executed by the keyboard controller 120 each time the system boots. Initially, the security system determines if a password or a key ID has been previously stored in the non-volatile memory 125. As indicated in decision block 402, the keyboard controller 120 initially determines if an admin password has been established in the non-volatile memory 125. If the upper byte of the non-volatile memory 125 is cleared at an admin password address, indicating that an admin password has not been established, the program proceeds to process block 404. In other words, to determine if an admin password has been established, the keyboard controller 120 looks at the memory location assigned to store the admin password. If the location is non-zero, this indicates that some password data has been stored in the memory location, and an admin password exists. At process block 404, an admin password established flag is cleared and the program proceeds to a decision block 408. If any value other than zero has been stored in the admin password area of the non-volatile memory 125, the program assumes that an admin password has been established and proceeds to process block 406. At process block 406, the admin level password established flag is set and control passes to the decision block 408.

At decision block 408, the same process of checking the upper byte in the non-volatile memory 125 is used to determine whether the user password has been established, except that a second memory location in the non-volatile memory 125, assigned to the user password, is examined. If the user password has not been established in the non-volatile memory 125, the program proceeds to process block 410. At process block 410, the user password established flag is cleared and the program proceeds to decision block 414. If the user password has been established in the non-volatile memory 125, the program proceeds to process block 412 where the user password establish flag is set, and control passes to decision block 414.

At decision block 414, a similar procedure is used to determine if a key ID has been established in the non-volatile memory 125. Again, the upper byte of a third memory location, assigned to the key 10, is examined. If a key ID has been established in the non-volatile memory 125, the program proceeds to process block 416. At process block 416, the key ID established flag is set (in the security status byte), and the program proceeds to a process block 420 (FIG. 4B) via a continuation point A. If the key ID is not established in the non-volatile memory 125, the program proceeds to process block 418, where the key ID established flag is cleared, and control passes to process block 420.

At process block 420, the keyboard controller 120 has determined if the user has previously established an admin password, a user password and a key ID, and in the next portion of the program the keyboard controller 120 determines if these stored values are valid. First, the admin password and key ID are read from the non-volatile memory 125. A checksum value of the key ID and admin password is calculated, as represented in the process block 420. A previously stored checksum value for the key ID and admin password is also read from the non-volatile memory 125. At decision 422, the recently calculated key ID and admin password checksum value is compared to the stored key ID and admin password checksum value. The purpose of the checksum comparison is to verify that the admin password and key ID values that have been retrieved from the non-volatile memory 125 are identical to the values which were previously stored in the non-volatile memory 125. If the previously stored checksum value for the key ID and admin password matches the recently calculated checksum value for the key ID and admin password, the program proceeds to a process block 424. If the calculated checksum and stored checksum values do not match, the stored values for the key ID or the admin password have changed from their previous values, and the non-volatile memory 125 data is corrupted. If this occurs, the program proceeds to process block 426 where the keyboard controller 120 clears the admin password, user password and key ID values which are stored in the non-volatile memory 125. The program proceeds to process block 428, where the keyboard controller 120 clears the admin password established flag, the user password established flag and the key ID established flag. Finally, at a process block 430, the keyboard controller clears the checksum value which was stored in the non-volatile memory 125. After the stored key ID and admin password values have been cleared and the integrity of the admin level of the security system restored, the program proceeds to process block 424.

At process block 424, the keyboard controller 120 reads the user password from the non-volatile memory 125, and the keyboard controller 120 computes a checksum value for the user password. At decision block 432, the keyboard controller 120 reads a stored checksum value for the user password from the non-volatile memory 125 and compares it to the calculated checksum value for the user password. If the stored checksum value equals the calculated checksum value for the user password, the program proceeds to decision block 434. If the stored checksum value does not equal the calculated checksum value, the user password has changed from its previously stored value. This indicates that the data in the non-volatile memory 125 is likely corrupted. Therefore, the corrupted data is deleted, and the integrity of the security system at the user level is restored. At this point, the program proceeds to process block 436. At process block 436, the keyboard controller 120 clears the user password value from the non-volatile memory 125. At a process block 438, the keyboard controller 120 clears the user password established flag. At a process block 440, the user password checksum byte is cleared from the non-volatile memory 125, and the program proceeds to decision block 434.

At decision block 434, the program begins determining which security levels have been activated by the user and have had their integrity verified by the security system 100. First, the keyboard controller 120 determines if the admin password established flag is set. If the admin password established flag is set, the program proceeds to decision block 442. If the admin password established flag is not set, the program proceeds to decision block 444. At decision block 444, the keyboard controller 120 determines if the user password established flag is set. If the user password established flag is not set, the security status byte indicates no security, and the initialize security routine ends at the end block 468 (FIG. 4C) via a continuation point C. If the user password established flag is set, the program proceeds to decision block 442.

At decision block 442 (FIG. 4B), the keyboard controller 120 determines whether the key ID established flag is set. If the key ID established flag is not set, the security system initialize routine ends at the block 468 (FIG. 4C) via the continuation point C without any security established. If the key ID established flag has been set, the program proceeds to process block 446.

At process block 446, the keyboard controller 120 executes a reset key subroutine, which polls the PS/2 ® port 130 and determines if a hardware key 230 is attached in an indicated PS/2 ® port 130. This routine is described in more detail with respect to FIGS. 5A–5B. As there may be peripheral devices other than the hardware key 230 attached to the PS/2 ® port 130, the reset key routine differentiates between the key 230 and other peripheral devices such as a mouse or a keypad. Upon completion, the subroutine returns with a key error status flag, which, if set, indicates that a hardware key 230 is not attached in the indicated PS/2 ® port 130. In some embodiments, there may be more than one PS/2 ® port. Therefore, assuming for the present discussion that there are two PS/2 ® ports in the subroutine call at process block 446, the subroutine checks the address of the PS/2 ® port #1 to determine if the key 230 is inserted in PS/2 ® port #1. When control returns, the keyboard controller 120, at a decision block 448 (FIG. 4C via continuation point B), determines whether the key 230 is attached to the PS/2 ® port #1 by checking the key error status flag controlled by the reset key subroutine. If the key error status flag is set, the hardware key 130 is not attached to PS/2 ® port #1, and control passes to process block 452. If the key error flag is not set, the key 230 is attached at PS/2 ® port #1, and the program proceeds to process block 450. At process block 450, the key attached to port #1 flag is set and the program proceeds to process block 458.

At process block 452, the keyboard controller 120 calls the reset key routine again. As discussed above, this subroutine call is described in more detail in FIGS. 5A–5B and returns with a key error status flag. If the key error status flag is set, it indicates that a key 230 is not attached in the indicated PS/2 ® port 130. In the subroutine call at process block 452, the reset key routine determines if a hardware key 230 is inserted in PS/2 ® port #2. When the subroutine call returns, decision block 454 determines whether the key 230 is attached to PS/2 ® port #2. If the key error status flag is not set, the key 230 is attached to PS/2 ® port #2, and the program proceeds to process block 456. At process block 456, the key attached to PS/2 ® port #2 flag is set. If the key error status flag is set (decision block 454), the key 230 is not present in PS/2 ® port #2. Thus, the initialize security routine ends at the block 468 without security. This indicates that even though a key ID had been previously established, the hardware key 230 is not present in either of the PS/2 ® ports 130 at this time.

Figure 6A:
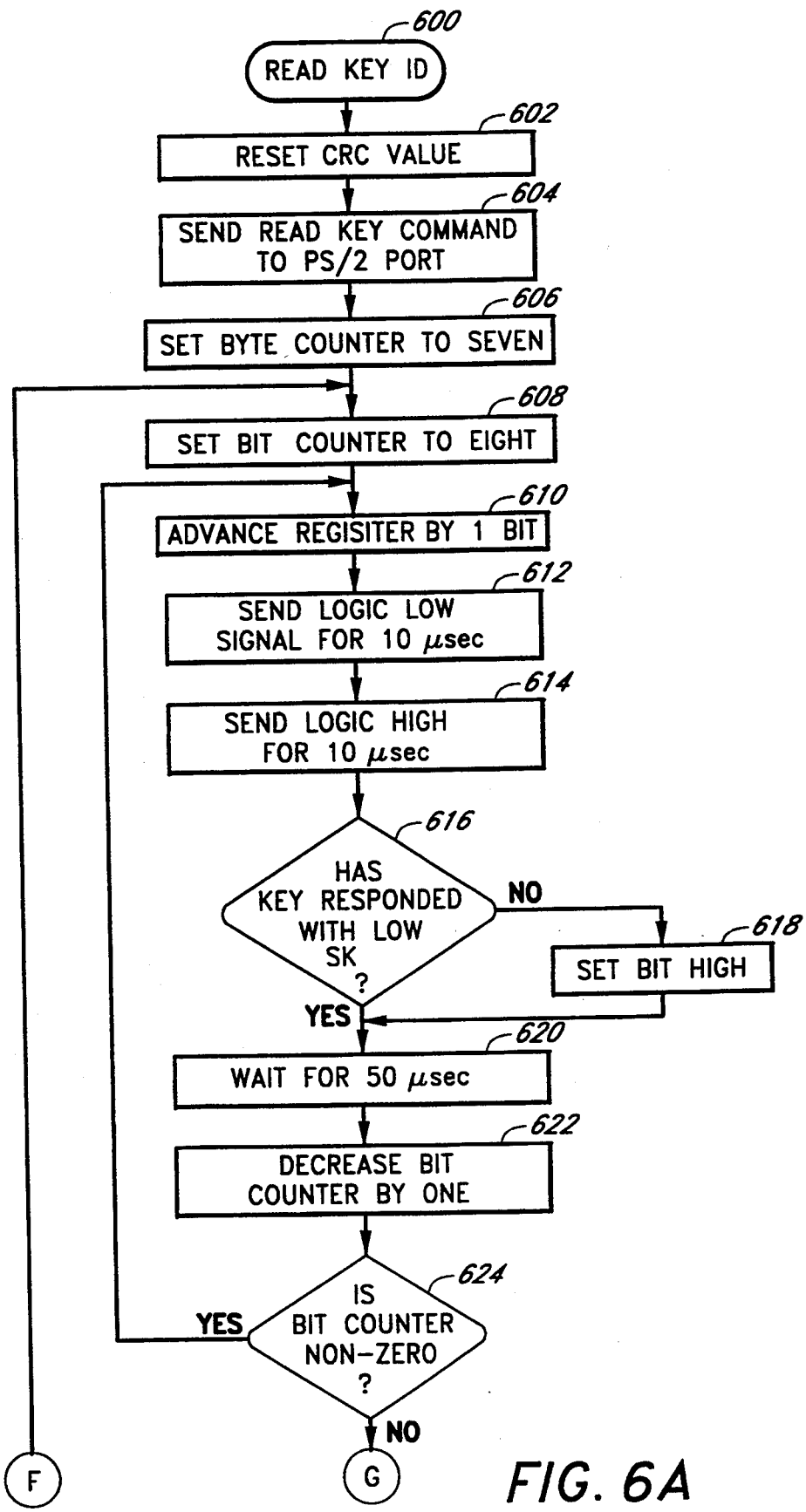
FIGS. 6A-6B depict a flowchart which details the general method employed within a read key ID subroutine.
Figure 6B:
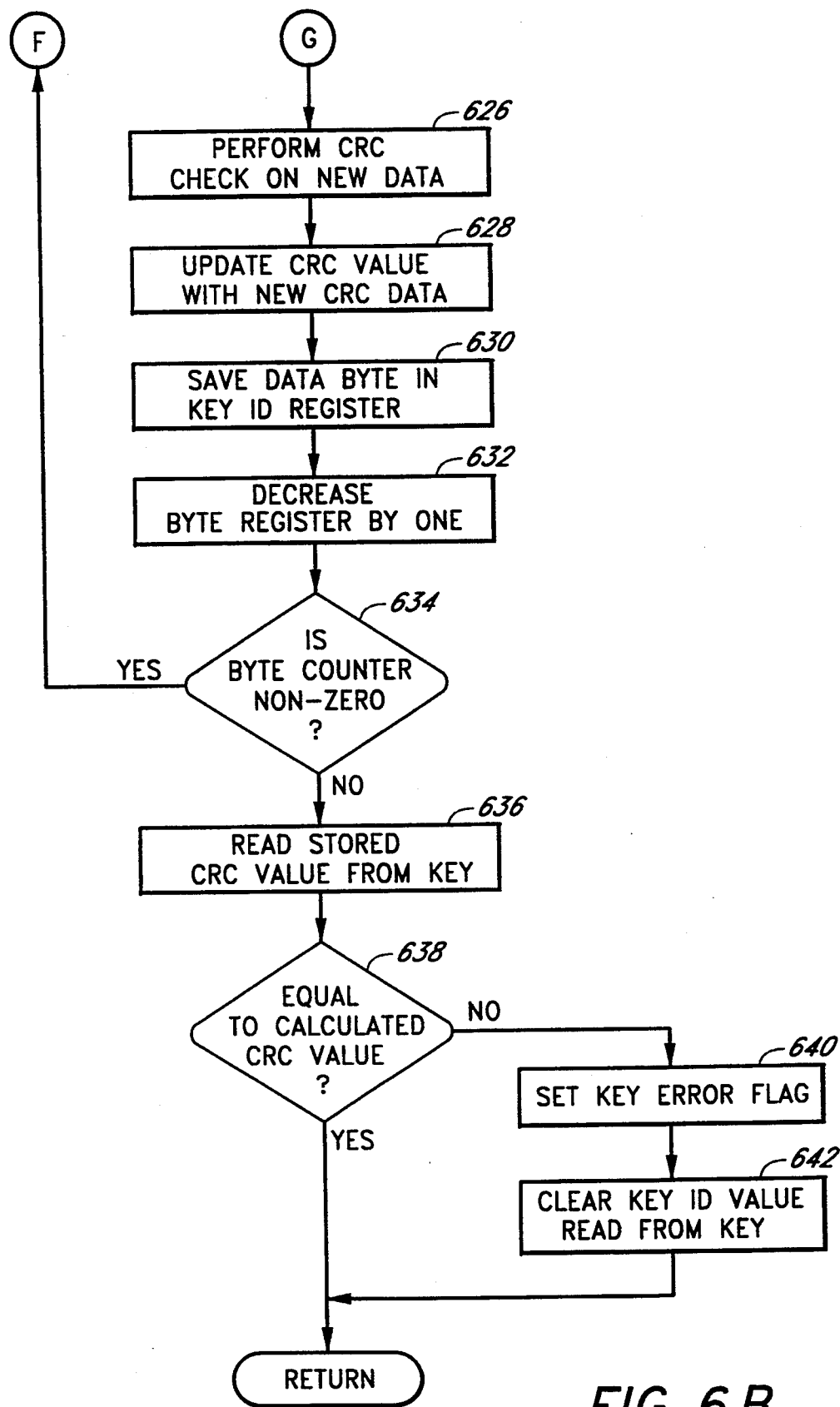

If a key is attached, at process block 458, the keyboard controller 120 calls the read key subroutine, which is described in more detail in FIGS. 6A–6B. The read key routine is used to read the key ID value from the hardware key 230 attached to the indicated PS/2 ® port 130. Depending on the location of the hardware key 230, the keyboard controller 120 reads the key ID from the address of the PS/2 ® port 130, as indicated by the key attached flags. The subroutine returns with the hardware key ID value stored in a key ID buffer. Upon the return from subroutine, control passes to decision block 460.

At decision block 460, the stored key ID is read from the non-volatile memory 125 and is compared to the key ID value read from the attached hardware key 230. If the stored key ID value is not equal to the read key ID value, the initialize security routine completes, as represented in the end block 468.

If the stored key ID matches the key ID read from the hardware key 230, control proceeds to a process block 462. At process block 462, the admin entered password match flag in the security status byte is set. This indicates that the stored key ID matches the hardware key present in one of the PS/2 ® ports 130, and enables the user to access all features enabled by an admin level access to the system. At process block 466, the user entered password match flag is cleared, and the initialize security routine completes, as represented in the end block 468.

Figure 5A:
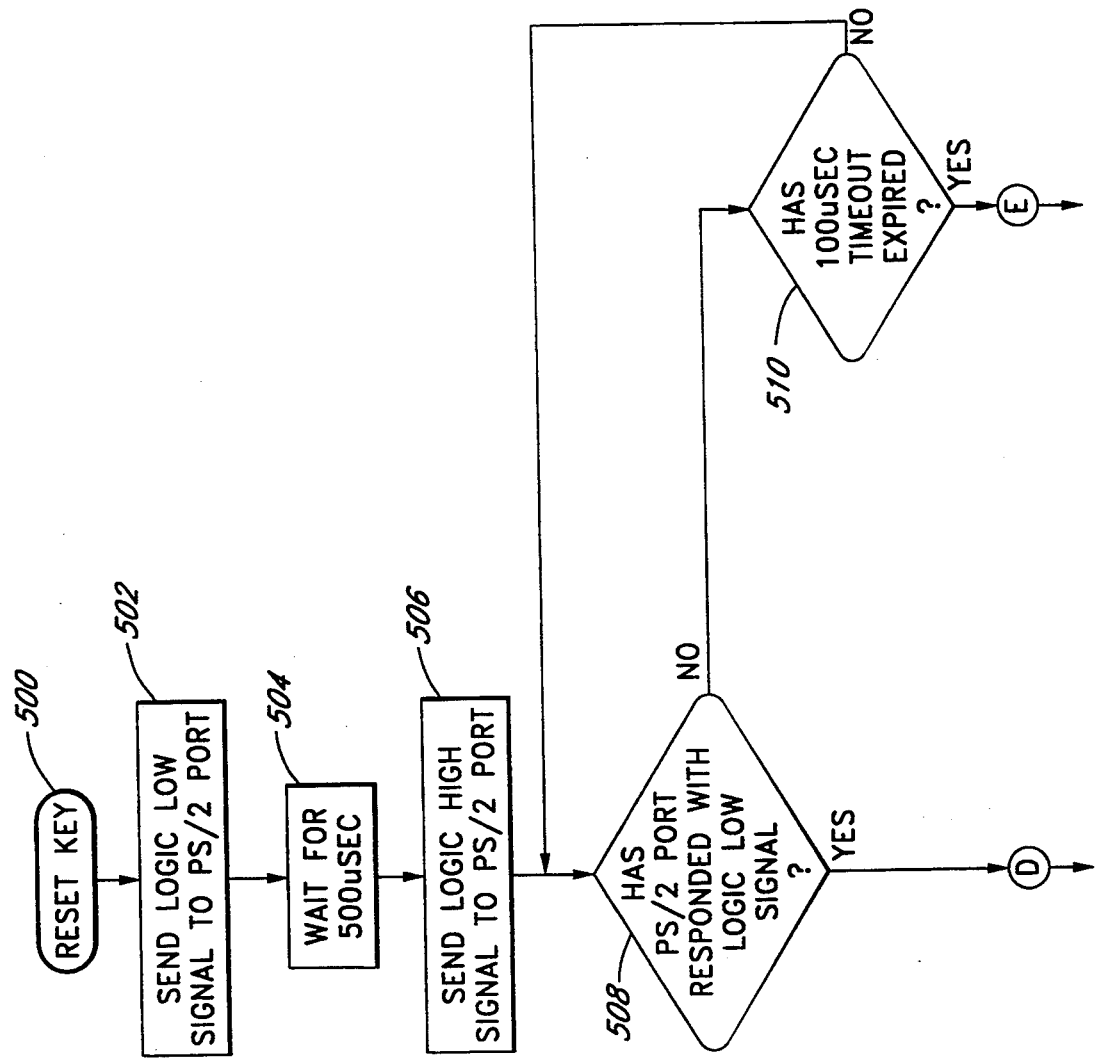
FIGS. 5A-5B depict a flowchart which details the general method employed within a reset key subroutine.
Figure 5B:
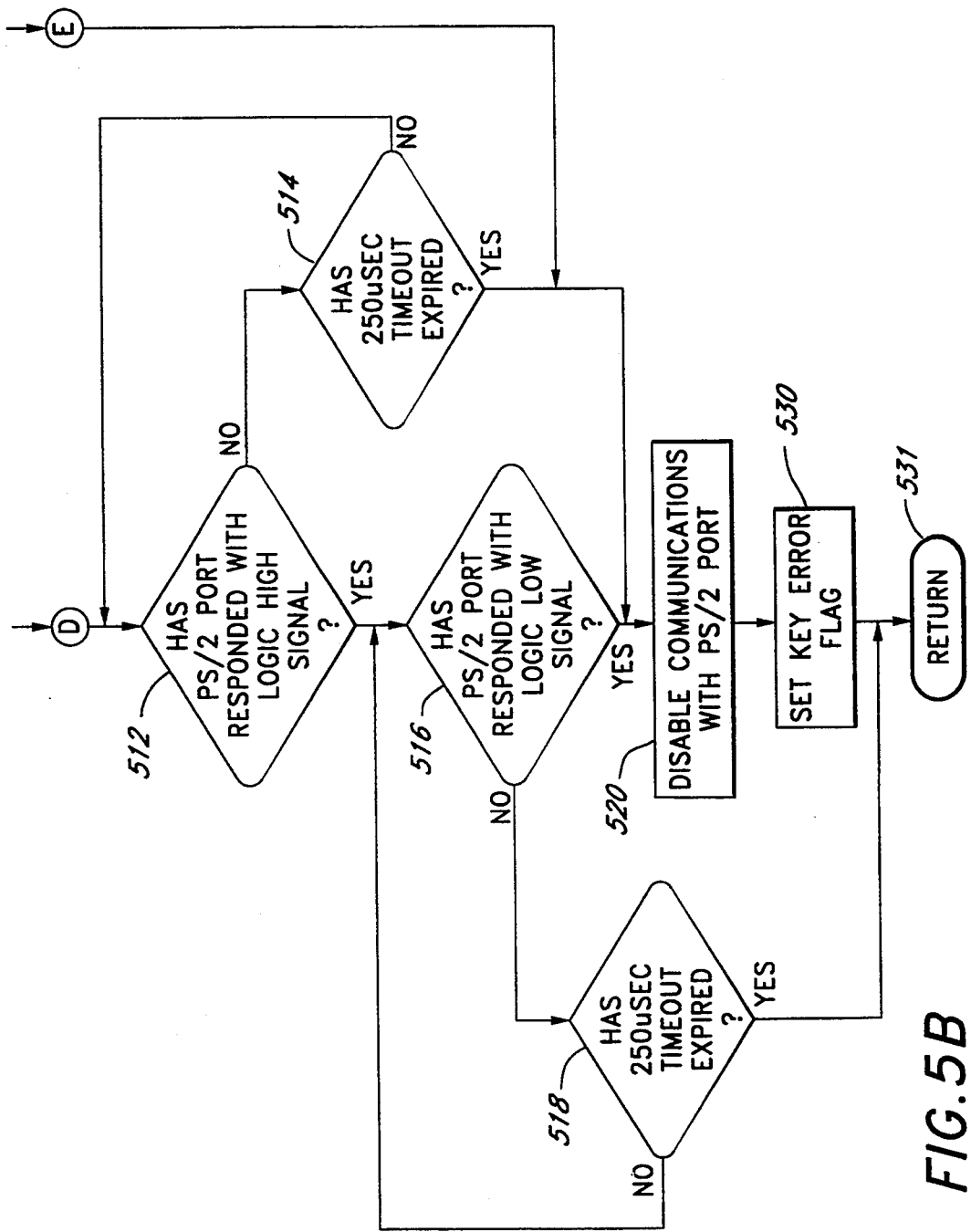

FIGS. 5A–5B illustrate the reset key routine. The reset key routine is used to determine if a key 230 is located in a PS/2 ® port 130. As discussed above, the keyboard controller 120 reads from the address of the indicated PS/2 ® port 130 to determine if a key is inserted. The reset key routine also differentiates the hardware key 230 from the other peripheral devices which may be inserted in a PS/2 ® port 130, such as a keypad or a mouse. The reset key routine sends a polling signal to the PS/2 ® port 130 on a data line, and looks at the response from the port 130 to determine if a key 230 is present. Basically, the hardware key 230 is designed to respond with a single toggle of the data line in response to the polling signal while a mouse or a keypad responds with several toggles of the data line. Therefore, if more than one toggle is received from the PS/2 ® port 130 data line or if no response is received, the reset key routine determines that a hardware key 230 is not inserted in the PS/2 ® port 130. If a hardware key 230 is located in the designated PS/2 ® port 130, the keyboard controller 120 resets the key so that its stored hardware value can be retrieved. The communications protocol for the key follow those of the memory in the key (Dallas Semiconductor DS 2400 in the present embodiment).

The reset key routine begins at a start block 500, and control passes to process block 502. At process block 502, the keyboard controller 120 sends a logic low signal to the PS/2 ® port 130, and control passes to process block 504. At process block 504, the keyboard controller 120 waits in a 500-microsecond wait loop before it proceeds to process block 506. At process block 506, the keyboard controller 120 sends a logic high signal to the PS/2 ® port 130 and proceeds to decision block 508.

At decision block 508, the keyboard controller 120 determines whether the PS/2 ® port 130 has responded with a logic level low signal. If the PS/2 ® port 130 has responded with a low signal, control passes to decision block 512 (FIG. 5B) via a continuation point D. If the PS/2 ® port 130 has not responded with a logic low signal, control passes to a decision block 510. At the decision block 510, the keyboard controller 120 determines if a 100 microsecond time-out period (for the present embodiment using a Dallas semiconductor DS2400 memory) has expired. If the time-out period has not expired, control passes to the decision block 508, and the keyboard controller 120 waits to determine if the PS/2 ® port 130 responds. If at decision block 510, the time-out has expired, the hardware key 230 is not inserted in the PS/2 ® port 130, and control passes to process block 520 (FIG. 5B) via a continuation point E.

At decision block 512 (FIG. 5B), the keyboard controller 120 determines if the PS/2 ® port 130 has responded with a logic level high signal. If the PS/2 ® port 130 has responded with a logic level high signal, control passes to decision block 516. If the PS/2 ® port 130 has not responded with a logic high signal at decision block 512, control passes to decision block 514. At decision block 514, the keyboard controller 120 determines if a 250 microsecond time-out period has elapsed. If the 250 microsecond time-out has not expired, control returns to the decision block 512, and the keyboard controller 120 once again checks the PS/2 ® port for a logic level high response signal. If the 250 microsecond time-out expires (decision block 514), the hardware key 230 is not inserted in the PS/2 ® port 130, and control passes to process block 520.

At decision block 516, the keyboard controller 120 determines if the device in the PS/2 ® port 130 has responded with a logic low signal. If the PS/2 ® port 130 has responded with a logic low signal, a peripheral device other than a key 230 is located in the PS/2 ® port 130 (i.e., more than one toggle of the data line indicates a device other than the key 230. At this point, control passes to a process block 520. If, at the decision block 516, the PS/2 ® port 130 has not responded with a logic level low signal, control passes to a decision block 518. At decision block 518, the keyboard controller 120 determines if a 250 microsecond time-out has expired. If the 250 microsecond time-out has not expired, control returns to the decision block 516 where the keyboard controller 120 once again checks if the PS/2 ® port 130 for a logic level low response signal. If at decision block 518, the 250 microsecond time-out has expired, the subroutine returns, as represented in a return block 531, to the calling program. The hardware key 230 has been properly inserted in the PS/2 ® port 130.

At process block 520, the communications with the PS/2 ® port 130 are terminated and control proceeds to a process block 530. At process block 530, the key error flag is set, indicating that a hardware key 230 has not been inserted in the PS/2 ® port 130. At this point, the subroutine returns to the calling routine, at the return block 531.

FIGS. 6A–6B illustrate the read key ID subroutine. The read key ID routine is used to read the key ID from a hardware key 230 which is inserted in a PS/2 ® port 130. The electronic hardware key 230 is designed to transfer one bit of data at a time. Therefore, the read key ID subroutine is designed to read one bit of data into a register and to advance storage of data in the register one bit at a time until the register is full. Once the register is full, the first bit of data that was read from the key 230 is positioned in the most significant bit, and the last bit of data that was read is positioned in the least significant bit. In addition, the read key routine includes a cyclical redundancy check ("CRC") calculation to ensure that the data received from the key 230 is the same as the data that was initially programmed into the key 230. The DS2400 memory contains a corresponding CRC value which is transmitted with the data stored.

The read key ID subroutine is entered at a process block 600, and control passes to a process block 602. At the process block 602, the previous CRC value which was stored in the keyboard controller 120 is cleared, and control passes to a process block 604. At the process block 604, the keyboard controller 120 sends a read key command to the PS/2 ® port 130 in which the hardware key 230 is inserted. This initiates the read operation.

As background information, the DS2400 operates on the basis of one-wire protocol—only one data line is used. The one-wire protocol has three separate states used to reset the device: (1) issue a command word to the device; (2) read a type identifier number; and (3) read the unique data and CRC byte. In communicating with the device, the device operates with write time slots and read time slots. For the present DS2400, all read and write slots are a minimum of 60 microseconds and a maximum of 120 microseconds in duration, with a minimum of one microsecond recovery time between individual write cycles. The cycles are defined separately for a write logic level high ("one") and a write logic level low ("zero"). For a write-one time slot, the data line is pulled to a logic low level and then released such that the data line returns to a high level within 15 microseconds after the start of the write time slot. To generate a write-zero time slot, the data line is pulled to a logic level low and held low for the duration of the write-time slot. In order to read the memory in the hardware key 230, the read key command is issued. In the present embodiment, this is the hexadecimal number OF transmitted over eight write slots (1 bit per time slot) to the hardware key 230. At the process block 606, the byte counter is set to seven in order to enable the reading of seven bytes of data stored in the hardware key 230.

At process block 608, a bit counter is set to eight to enable eight bits of the key ID to be read sequentially. At process block 610, the key ID register is prepared to receive the data from the hardware key 230 by advancing a register pointer by 1 bit. At a process block 612, the keyboard controller 120 initiates a read time slot by sending a logic low signal to the PS/2 ® port for ten microseconds (read time slots being defined for the DS2400 memory as a low level on the data line for 1–15 microseconds). At process block 614, the keyboard controller allows the data line to return to a logic high signal for an additional ten microseconds.

At decision block 616, the keyboard controller 120 determines if the PS/2 ® port has responded to the initiation of the read time slot with a logic low signal. If not, control passes to process block 618. At process block 618, the data bit which is advanced into the key ID register is set high (a "1" is read from the memory) and control advances to process block 620. If at decision block 616, the keyboard controller 120 detects that the key 230 responds with a logic low signal, nothing is changed for the bit which is advanced into the key ID register, because it is already zero. Control returns to the process block 620. At process block 620, the keyboard controller 120 waits for 50 microseconds for the read cycle to complete. At process block 622, the bit counter is decreased by one. At decision block 624, the keyboard controller 120 checks the bit counter. If the bit counter is non-zero, control passes to process block 610, and the next bit of data from the hardware key 230 is read into the keyboard controller 120. If the bit register equals zero (decision block 624), this indicates that an entire byte of data has been read from the hardware key 230, and control passes to a process block 626 (FIG. 6B, via continuation point G).

At process block 626, the keyboard controller 120 performs a CRC check on the byte just received from the key 230. At a decision block 628, the keyboard controller 120 updates the CRC value that was previously stored for the key ID value with the CRC value of the newly acquired key ID byte of data. At process block 630, the data byte which has been read from the hardware key 230 is saved in the key ID register. At process block 632, the byte register is decreased by one, and control passes to decision block 634.

At decision block 634, the keyboard controller 120 determines if the byte register is non-zero. If the byte register is non-zero, control passes to process block 608 (FIG. 6A) via the continuation point F to enable the next byte of data to be read from the hardware key 230. If at the decision block 634 (FIG. 6B), the keyboard controller 120 determines that the byte register equals zero, the entire key ID has been read into the keyboard controller 120, and control passes to a process block 636. At the process block 636, the eight-bit CRC value is read from the hardware key 230 using the same read procedure described above. At decision block 638, the CRC value which was read from the key 230 is compared to the calculated CRC value. If the values are not equal, control passes to process block 640. If the calculated and received CRC values are equal, the subroutine returns to the security initialization routine (FIG. 4) with a valid key ID in the key ID register.

At process block 640, the key error flag is set because the data received from the key 230 is different than the data that was previously stored in the key 230. At process block 642, the incorrect data read from the key 230 is cleared from the key ID register, and control returns to the calling routine (i.e., the subroutine returns to the system security initialization routine (FIG. 4)).

Figure 7:
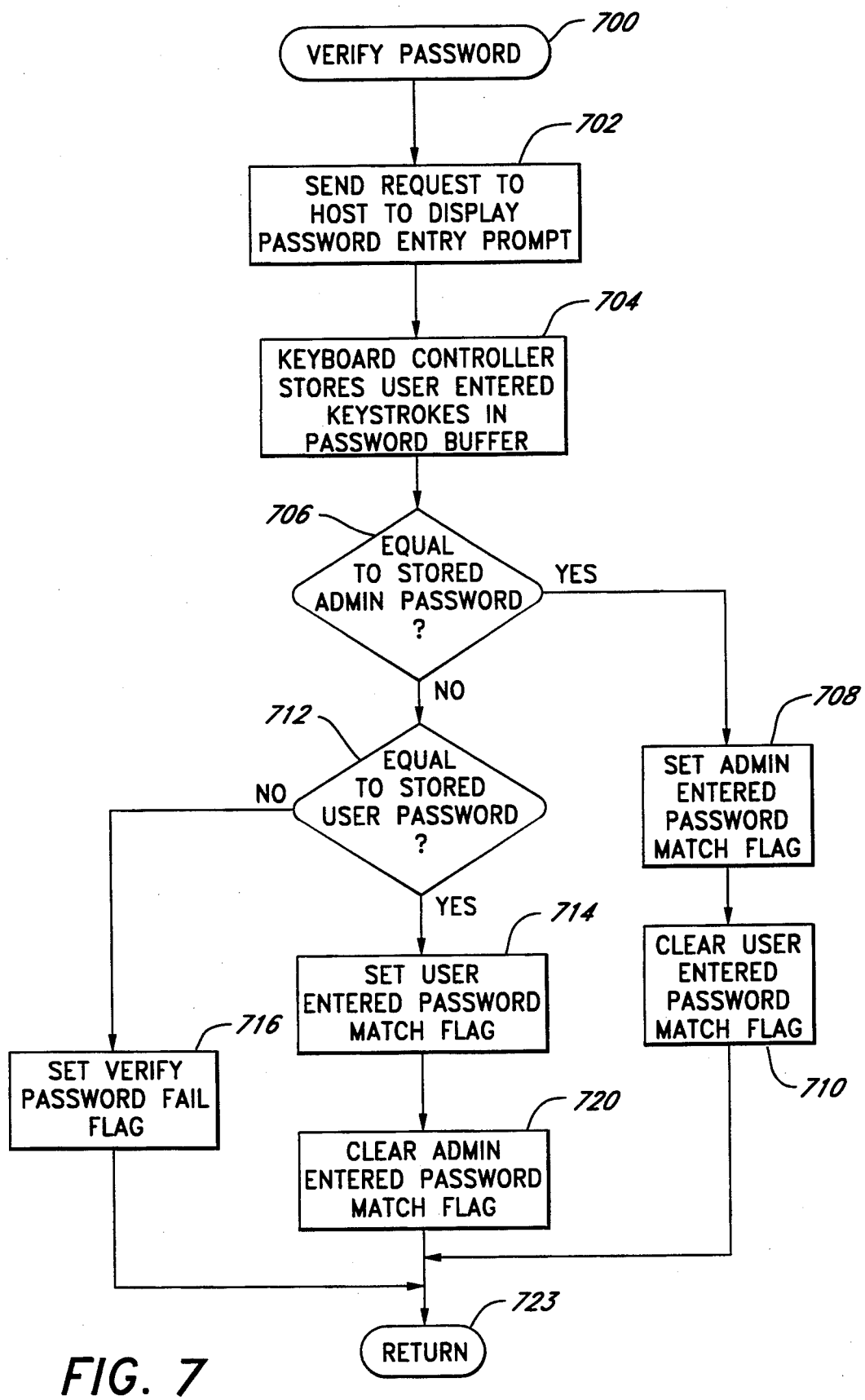
FIG. 7 depicts a flowchart which details the general method employed within a verify password subroutine.

FIG. 7 illustrates the verify password subroutine. The verify password subroutine is used to determine if the user has entered a valid password. The routine begins at a start block 700, and control passes to a process block 702. At process block 702, the keyboard controller 120 requests that the host system 110 display a password entry prompt on the video terminal 105. The keyboard controller 120 monitors the keyboard 135. At a process block 704, the keyboard controller 120 monitors the keystrokes on the keyboard 135. The keyboard controller 120 stores the scan codes for the depressed keys in password buffer #1. With each entry of a key stroke, the keyboard controller 120 sends a signal to the host system 110 indicating that a key has been depressed until the [ENTER] key is depressed by the user. When the [ENTER] key is depressed by the user, the keyboard controller 120 sends a special signal to the host system 120 indicating that the user has completed the entry of the password, and communication with the host system 110 is terminated until the verify password routine is completed.

At a decision block 706, the keyboard controller 120 reads the stored administrative password from the non-volatile memory 125 and compares the password stored in the non-volatile memory 125 to the keys depressed by the user as stored in password buffer #1. If the password entered by the user is not equivalent to the stored administrative password from the non-volatile memory 125, control passes to a decision block 712. If the user-entered password is equivalent to the stored administrative password, control passes to a process block 708. At the process block 708, the admin entered password match flag is set. At a process block 710, the user entered password match flag is cleared, and the verify password subroutine returns to the calling routine, as represented in a return block 723.

At the decision block 712, the user password is read from the non-volatile memory 125 and is compared to the password entered by the user. If the user entered password matches the stored user password, control passes to a process block 714. If the password value entered by the user does not equal the stored user password, control passes to a process block 716. At the process block 716, the verify password fail flag is set, and the verify password subroutine returns, as indicated in return block 723.

At the process block 714, the user entered password match flag is set, and control passes to a process block 720. At the process block 720, the admin entered password match flag is cleared, and the verify password subroutine returns as indicated in the return block 723.

Upon the completion of tasks performed by the host illustrated in FIGS. 3A–3B, and the routines illustrated in FIGS. 4–7 performed by the keyboard controller 120, the security system is initialized, and the remainder of the system boot operations can be completed.

The present invention also incorporates a security parameter modification lockout feature which causes the keyboard controller 120 to ignore any security parameter modifications after the initial parameters have been set during the boot operations and during the system setup program. Once the system boot and setup operations are complete, and the lockout feature is active, the host 110 can no longer access the security parameters in the keyboard controller 120. Accordingly, a virus, or the like, cannot access the parameters to disable security or change other parameters.

In the present embodiment, if the user wishes to modify any of the security parameters, the user reboots the system, enters the correct password or inserts a valid key in one of the PS/2® ports, and enters the setup program. However, if security has not been established, upon rebooting the system, the user may immediately enter the setup operations and establish the hardware key 230 and password to initialize the security system 100. Changes to the security parameters which do not occur during the setup operation are ignored. This prevents an unauthorized user from changing the security parameters while the computer system is operating. Thus, the security system of the present invention permits access to the security parameters only by authorized users. In addition, by enabling both an administrative level and a user level of security, the types of modifications to the security parameters, and the setup configuration options that are enabled, will be limited by the level of access for which the user is authorized.

The remainder of the features of the security system 100 are accessible during setup operations. From the setup screen, the following commands can be issued: create passwords, delete admin and user password, delete user password, establish key ID and delete key ID. The user is unable to perform the create or delete a password commands until a valid key ID has been established.

As described above, the security system can not be accessed until a key ID is established as a security system override. In order to establish a key ID, the user selects the established key ID command in setup operations and inserts a hardware key 230 into one of the PS/2® ports 130. The establish key ID routine is described in more detail below in association with the flowchart of FIG. 8.

The create password command creates an admin password if one has not previously been established. If an admin password has been established, the create password routine creates a user password. If both an administrative and a user password have been established, the create password routine returns with an error flag. The create password routine is discussed in more detail with reference to FIG. 9.

The delete admin and user level password command deletes both the admin and user level passwords if they exist. The delete admin and user level passwords routine returns a fail status if no admin password has been established. The delete user password command is similar to the delete admin and user level password command, except it only deletes the user level password. A delete password routine illustrated in FIG. 10 executes in response to both of the delete admin and user password command and the delete user password command.

Figure 8:
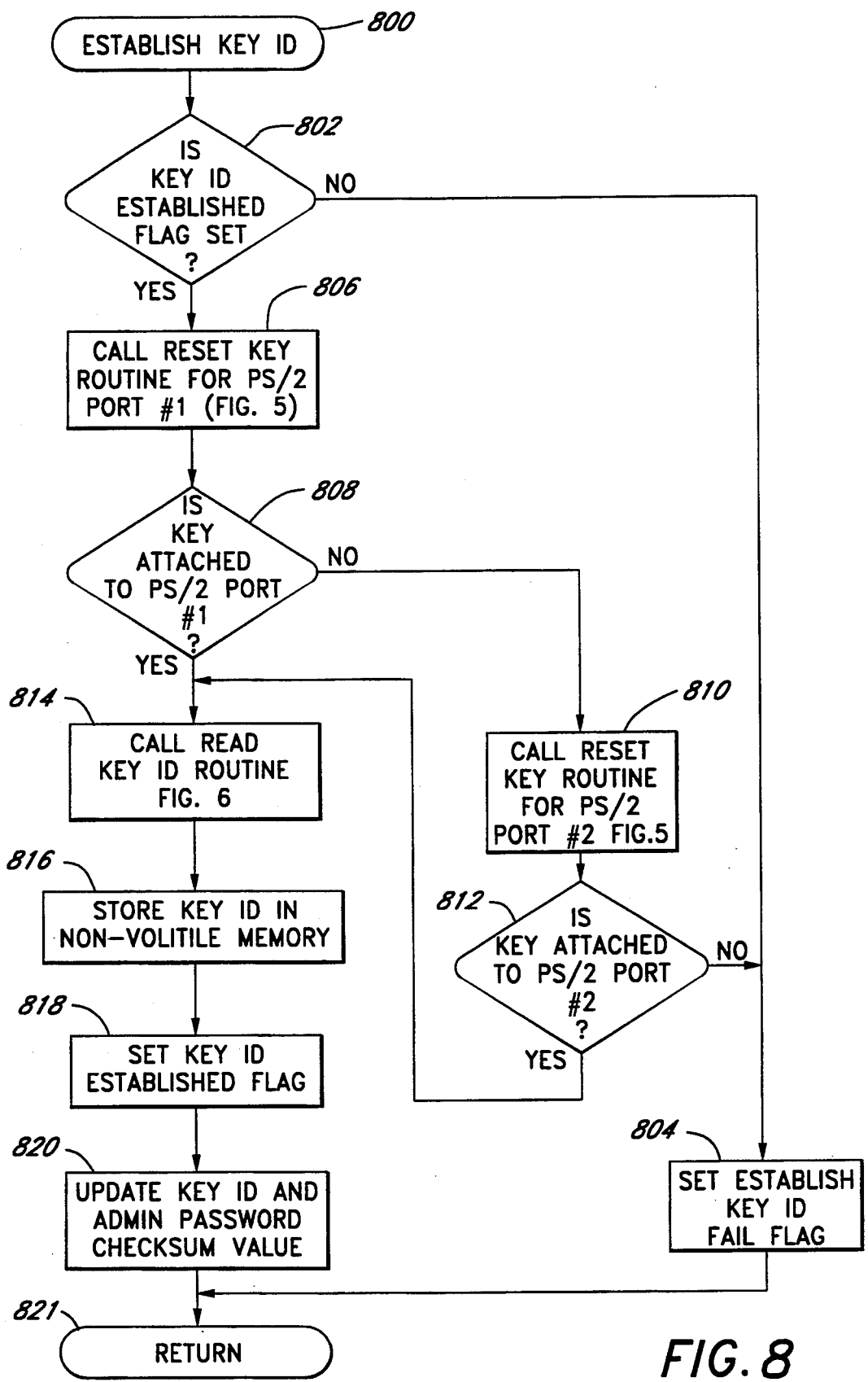
FIG. 8 depicts a flowchart which details the general method performed within the establish key ID routine which is employed by the computer security system of the present invention.

The delete key ID command deletes the key ID stored in the non-volatile memory 125, and it disables the security system 100 at the same time. In order for the security system to be active, a key ID override is stored in the non-volatile memory. If the key ID is deleted, the security system is disabled until a new key ID is established. The delete key ID command is described in more detail in association with FIG. 11 below, FIG. 8 illustrates the establish key ID routine. As described above, the establish key ID routine is used to initialize the override key for the security system. From a start block 800, the establish key ID program proceeds to a decision block 802 where it determines if a key ID has already been established. At the decision block 802, the keyboard controller 120 determines whether the key ID established flag has been set. If the key ID established flag has been set, control passes to a process block 804 where the keyboard controller 120 sets an establish key ID fail flag, indicating no security is active. If the key ID established flag has not been set, control passes to a process block 806. At the process block 806, the establish key ID routine determines if a hardware key 230 has been inserted into PS/2® port #1 by calling the reset key routine for PS/2® port #1, illustrated in more detail in FIGS. 5A-5B. The initial subroutine call at the process block 806, checks to see if a hardware key 230 is installed in PS/2® port #1. The reset key routine was described in more detail in association with FIGS. 5A-5B above. Control proceeds to a decision block 808, where the keyboard controller 120 determines whether a hardware key 230 is attached to PS/2® port #1. If the key error flag is not set, then the keyboard controller 120 determines that a key is attached to PS/2® port #1, and control passes to a process block 814. If the reset key routine returns a key error flag, then the keyboard controller 120 determines that the key 230 is not attached to PS/2® port #1, and control passes to a process block 810.

At the process block 810, the reset key routine, illustrated in FIGS. 5A-5B, is once again called. This time the keyboard controller 120 checks PS/2® port #2 to determine if a key 230 has been inserted in port #2. Control passes to a decision block 812. At the decision block 812, the keyboard controller 120 determines if a key 230 is attached to PS/2® port #2. If the reset key routine does not return a key error flag, then the keyboard controller 120 determines that a key is attached to PS/2® port #2, and control passes to the process block 814. If the reset key subroutine returns with the key error flag set, then the key is not attached to PS/2® port #2, and control passes to a process the block 804. At process block 804, the establish key ID fail flag is set, and the establish key ID routine returns as indicated in a return block 821, without establishing a key ID.

At the process block 814, the read key ID routine illustrated in FIGS. 6A-6B is called. The keyboard controller 120 reads the key ID from the PS/2® port 130 in which the key 230 is attached and stores the key ID value in a temporary key ID register. Control proceeds to a process block 816. At the process block 816, the key ID value in the temporary register is transferred to the non-volatile memory 125 and is stored in the key ID storage location. Control passes to a process block 818. At the process block 818, the key ID established flag is set, and control passes to a process block 820. At the process block 820, the key ID/admin password checksum value is updated to include the value of the new key ID. The updated key ID/admin password checksum value is stored in the non-volatile memory 125 in the appropriate checksum location. The establish key ID routine completes, the security system is initialized, and control returns to the setup program via the return block 821.

Figure 9:
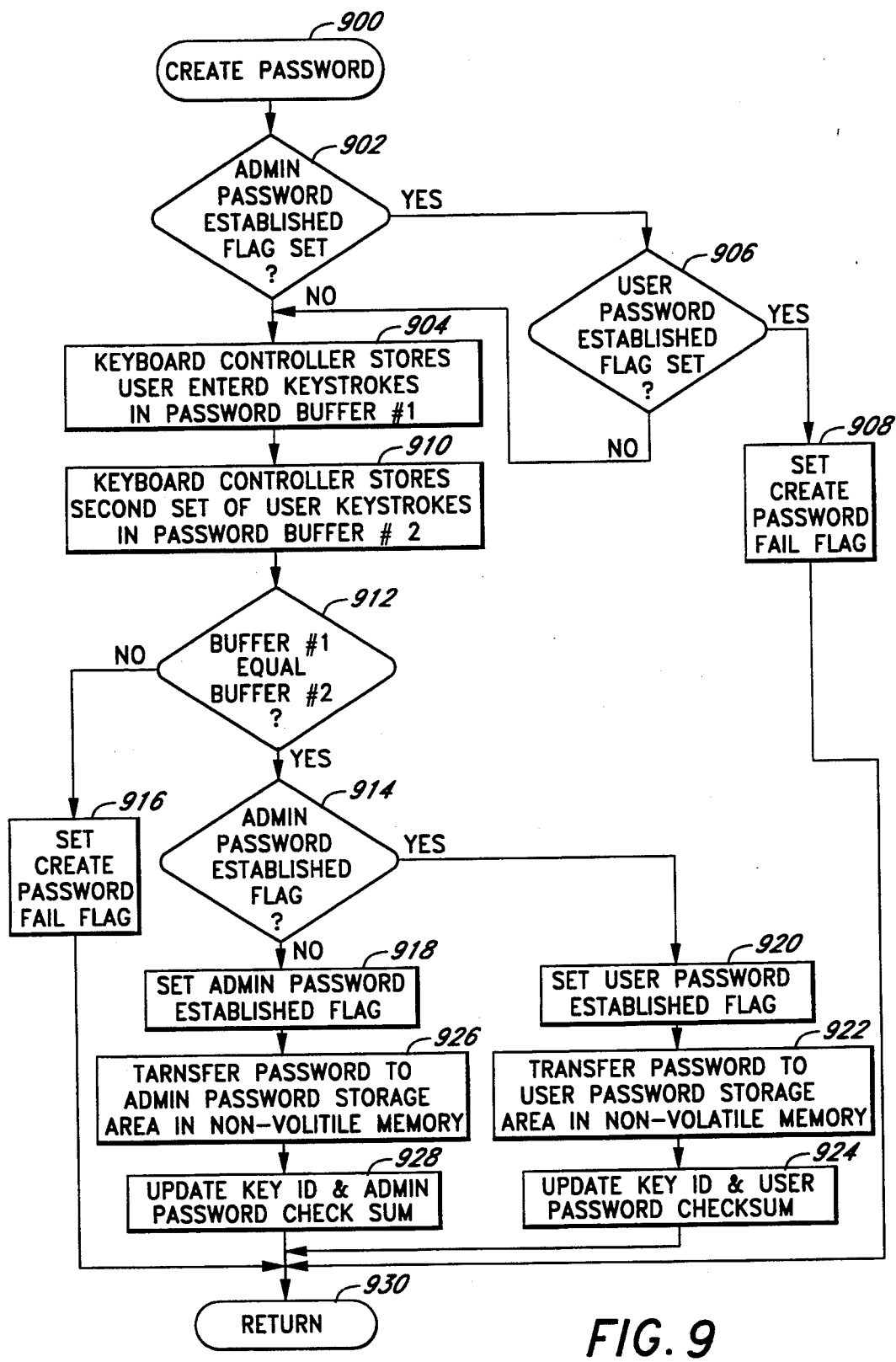
FIG. 9 depicts a flowchart which details the general method performed by the create password routine which is employed by the computer security system of the present invention.

FIG. 9 illustrates the create password routine. Upon selection of the create password command in the setup operation, the host 110 reads the security status byte, and determines if a key ID has been established. If the key ID has been established, the create password routine is executed by the keyboard controller 120. If a key ID has not been established, the create password routine is not run, and the setup program options remain unchanged until a new setup command is selected.

The create password routine begins at start block 900, and proceeds to a decision block 902. At the decision block 902, the keyboard controller 120 determines if the admin password established flag is set. If the admin password established flag is not set, control proceeds to a process block 904. If the admin password established flag is set, control proceeds to decision block 906.

At the decision block 906, the keyboard controller 120 determines if the user password established flag has been set. If the user password established flag has not been set, control passes to the process block 904. If the user password established flag has been set, control proceeds to a process block 908. At the process block 908, the create password fail flag is set, and the subroutine returns, as represented in a return block 920, without creating a password because both an admin and user password have been previously established.

At the process block 904, the user is prompted to enter a new password, and the keyboard controller 120 monitors the activity of the keyboard 135. The keyboard controller 120 stores the scan codes for the depressed keys in password buffer #1. With each entry of a key stroke, the keyboard controller 120 sends a signal to the host system 110 indicating that a key has been depressed until the [ENTER] key is depressed by the user. When the [ENTER] key is depressed by the user, the keyboard controller 120 sends a signal to the host system 120 indicating that the user has completed the entry of their password, and control proceeds to process block 910. The user is again prompted to enter the new password again for verification purposes. At the process block 910, the keyboard controller 120 scans the keyboard 135 for the second set of user-entered keystrokes until the [ENTER] key is detected. As indicated above, with each entry of a key stroke, the keyboard controller 120 send a signal to the host system 110 indicating that a key has been depressed until the [ENTER] key is depressed by the user. When the [ENTER] key is depressed by the user, the keyboard controller 120 sends a signal to the host system 120 indicating that the user has completed the entry of their password. The keyboard controller 120 stores the scan codes for the second set of user-entered keystrokes in password buffer #2, and control proceeds to a decision block 912.

At the decision block 912, the user-entered keystrokes in buffer #1 are compared to the user-entered keystrokes in buffer #2. If they are equal, control passes to a decision block 914. If the two sets of scan codes are not equal, control passes to a process block 916. At the process block 916, the create password fail flag is set because the user did not enter the same password both times, and control returns to the setup program without creating either a user or admin level password.

At the decision block 914 (buffer #1 and buffer #2 equal at decision block 912), the keyboard controller 120 again determines if the admin password established flag has been set. If the admin password established flag has not been set, control passes to a process block 918. If the admin password established flag has been set, control passes to a process block 920. At the process block 920, the user password established flag is set and control passes to a process block 922. At process block 922, the password stored in buffer #1 is transferred to the user password storage area in the non-volatile memory 125 and control passes to a process block 924. At the process block 924, the user password checksum is recalculated and stored in the user password checksum location in the non-volatile memory 125. The create password routine completes, as represented in the return block 930.

At the process block 918, the admin password established flag is set, and control passes to a process block 926. At process block 926, the password stored in buffer #1 is transferred to the admin password storage area in the non-volatile memory 125, and control passes to a process block 928. At process block 928, the key ID and admin password checksum value is recalculated and stored in the non-volatile memory 125, and the create password routine returns complete, as represented in the return block 930.

Figure 10:
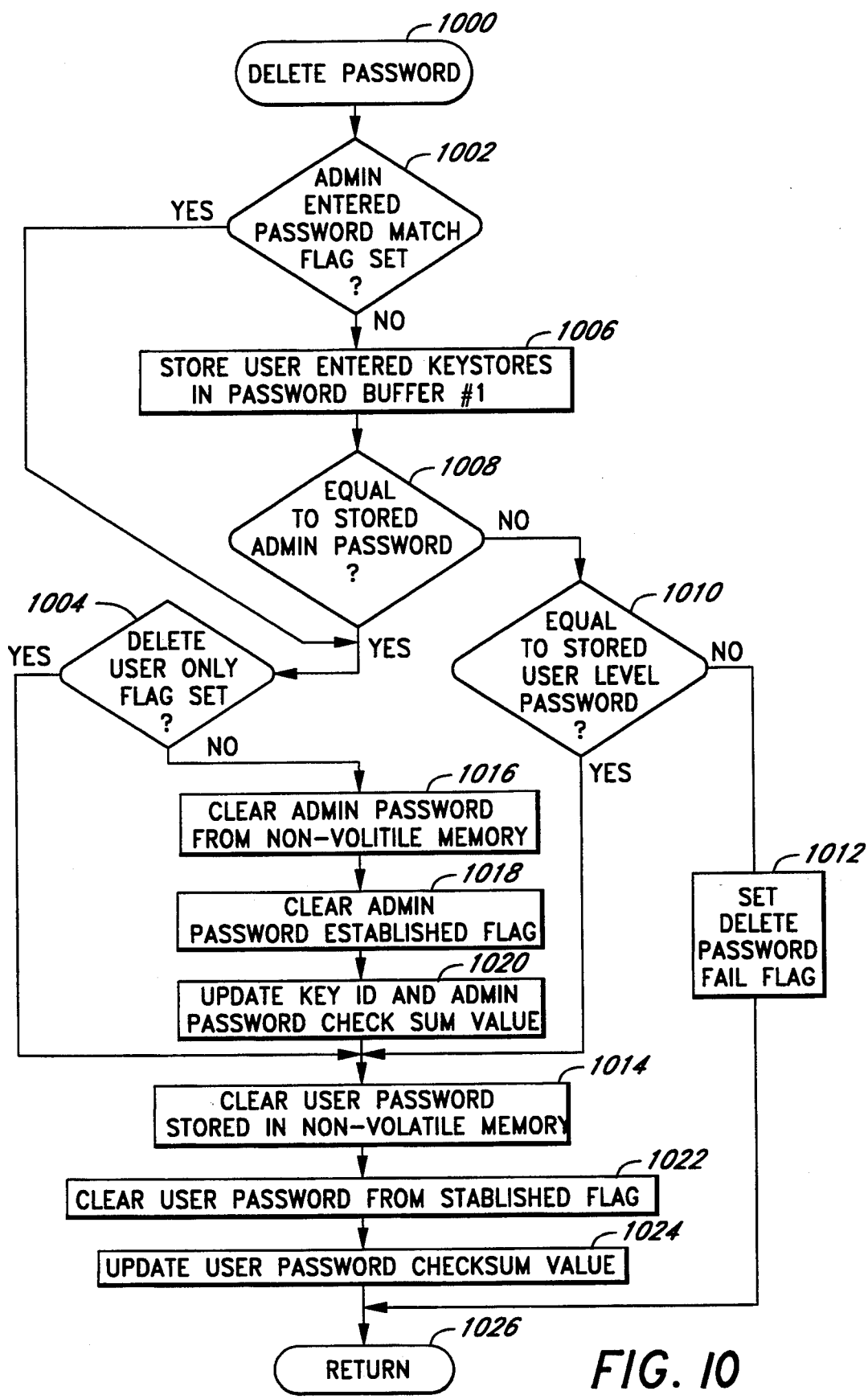
FIG. 10 depicts a flowchart which details the general method performed by the delete password routine employed by the computer security system of the present invention.

FIG. 10 illustrates the delete password routine which is used to delete only the user password or to delete both the admin and user passwords. In order for one or more of the passwords to be deleted, either the valid hardware key 230 is inserted in one of the PS/2 ® ports 130 or the password which is to be deleted, or a password of a higher level is entered by the user. These requirements for deletion of a password are included to allow only authorized users to alter the passwords at their security level or at a security level lower than theirs.

The delete password routine begins at a start block 1000, and control passes to a decision block 1002. At the decision block 1002, the admin entered password match flag is checked. If the admin entered password match flag is set at this point, a valid key is inserted in one of the PS/2 ® ports and control passes to a decision block 1004. This is because if the key 230 is attached, the presence of the key will have been deleted in the initialize security system routine at start-up. Since a valid hardware key has been inserted into one of the PS/2 ® ports, the user need not enter a password on the keyboard in order to delete the desired passwords. If the admin entered password match flag is not set, then a valid key has not been inserted into one of the PS/2 ® ports, and control passes to a process block 1006.

If the valid hardware key 230 has not been attached to one of the PS/2 ® ports 130, as determined in the decision block 1002, the user is prompted to enter the password that is to be deleted or a higher level password, and the keyboard controller 120 monitors the activity of the keyboard 135. At the process block 1006, the keyboard controller 120 scans the keyboard 135 until the [ENTER] key is depressed. With each entry of a key stroke, the keyboard controller 120 sends a signal to the host system 110 indicating that a key has been depressed until the [ENTER] key is depressed by the user. When the [ENTER] key is depressed by the user, the keyboard controller 120 sends a signal to the host system 120 indicating that the user has completed the entry of their password, and communication with the host system 110 is terminated until the delete password routine is completed. The keyboard controller 120 stores the scan codes for the user-entered keystrokes in password buffer #1, and control passes to decision block 1008.

At a decision block 1008, the user-entered password is compared to the admin password which is stored in the non-volatile memory 125. If the user-entered password in buffer #1 equals the stored admin password from the non-volatile memory 125, control passes to the process block 1004. If the user-entered password in buffer #1 does not equal the stored admin password, then control passes to a decision block 1010. At the decision block 1010, the keyboard controller 120 compares the user-entered password from password buffer #1 to the admin level password stored in the non-volatile memory 125. If the password in password buffer #1 equals the stored user level password, then control passes to the process block 1014. If the user-entered password does not equal the stored user level password, then control passes to a process block 1012. At the process block 1012, a delete password fail flag is set, and the delete password routine completes, as represented in a return block 1026.

At decision block 1004, the keyboard controller 120 determines whether the delete user password only flag is set. The delete user password only flag is set if the user requested the delete user password command rather than the delete admin and user passwords command in the set-up operations. If the flag is set, control passes to the process block 1014. If the delete user password only flag is not set, control passes to a process block 1016. At the process block 1016, the admin password stored in the non-volatile memory is cleared, and control passes to a process block 1018. At the process block 1018, the admin password establish flag is cleared, and control passes to a process block 1020. At the process block 1020, the key ID/admin password checksum is updated, and the new key ID/admin password checksum is stored in the non-volatile memory 125. Control passes to the process block 1014.

At the process block 1014, the user level password stored in the non-volatile memory is cleared, and control passes to a process block 1022. At process block 1022, the user password established flag is cleared, and control passes to a process block 1024. At the process block 1024, the user password checksum value is updated and is stored in the user password checksum location of the non-volatile memory 125. After updating the user password checksum, the delete password routine completes, as represented in the return block 1026.

Figure 11:
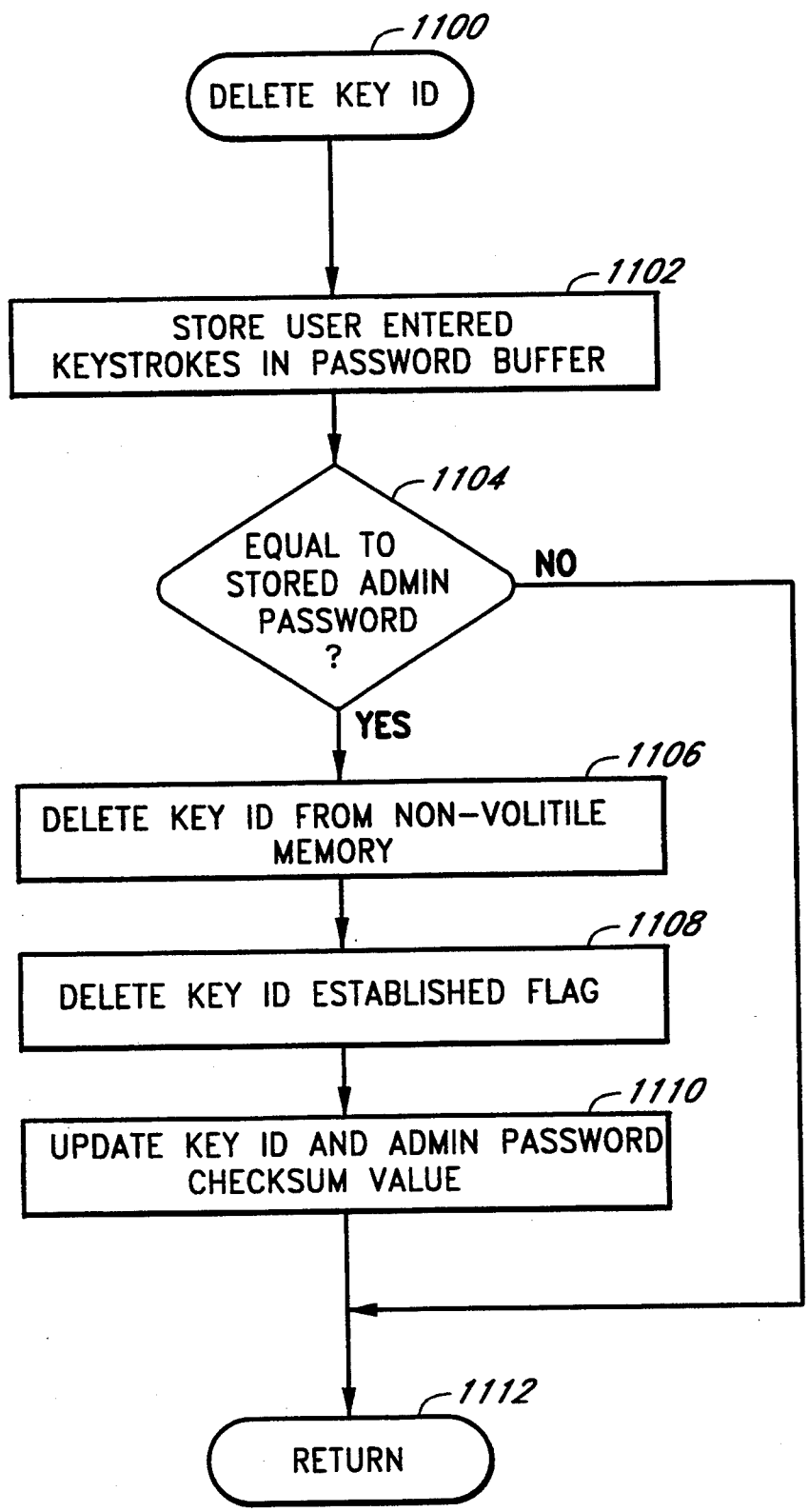
FIG. 11 depicts a flowchart which details the general method performed by the delete key ID routine employed by the computer security system of the present invention.

FIG. 11 illustrates the delete key ID routine which is used to delete the override key ID stored in the non-volatile memory 125 and to disable the security system of the present invention. In order for the key ID to be deleted, the user enters the valid admin level password. This enables only an authorized user to delete the override key.

The delete key ID routine begins at a start block 1100 and control passes to a decision block 1102. Upon initialization of the delete key ID command, the user is prompted to enter the administrative level password. At the process block 1102, the keyboard controller 120 monitors the keyboard 135 and stores all of the scan codes for the keys depressed by the user until the [ENTER] key is depressed. The scan codes for the user depressed keys are stored in a password buffer, and control passes to a decision block 1104. At the decision block 1104, the keyboard controller 120 compares the user entered password to the admin level password stored in the non-volatile memory 125. If the entered password in the password buffer equals the admin level password, control passes to a process block 1106. If the user entered password does not equal the admin level password, the delete key ID routine returns to the setup program without deleting the key ID from the non-volatile memory 125.

At the process block 1106, the key ID is deleted from the non-volatile memory 125 and control passes to a process block 1108. At the process block 1108, the key ID established flag is deleted, which effectively removes the override key, and control passes to a process block 1110. At process block 1110, the key ID and admin password checksum value is updated, and the delete key ID routine completes, as represented in a return block 1112.

One advantage of the security system of the present invention is that the same key may be used to secure several computer systems. Because the security system is not established when the user purchases the system and because the user establishes a key ID before the security system is initialized, a user of several systems may use the same key to establish an override of the security system on several computers. Each computer system is not matched with a specific key until the user initializes the override key using a system compatible key. Once the key ID is established, the same key ID enables access to the system; however, the host system is not initially matched with a single key. This is advantageous in the case where a single administrator is responsible for multiple computers, and does not wish to track multiple hardware keys. Using the security system of the present invention, the administrator need only initialize the security system of each machine with the same hardware override key. When the administrator wishes to access any of the machines, he can insert the single hardware key.

In addition, if an administrator loses his key, he can still access the systems with an admin level password. After accessing the security system, the administrator can select the delete key ID command from the setup program, as described above, and select the establish key ID command from the set-up operations to establish a new override key ID.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed:

1. A security system for a host computer, said security system being activated during the system boot operations and controlling access to the host computer, said security system comprising;
   at least one communications port;
   a key which is connectable to said at least one communications port, said key having an associated key ID value;
   a keyboard;
   a first non-volatile memory having defined therein a stored key ID value and a first password value, said stored key ID value corresponding to said key ID value, said password value corresponding to a selected first access password; and a microprocessor based peripheral controller in communication with said at least one communications port, said keyboard, said non-volatile memory and said host computer, wherein said peripheral controller is responsive to either said key being connected to said communications port or entry of said access password on said keyboard to permit access to said host computer.

2. A security system for a host computer as defined in claim 1, wherein said non-volatile memory has further defined therein a second password value, said second password value corresponding to a selected second access password, and wherein, said peripheral controller is further responsive to entry of said second access password on said keyboard to permit access to less than all of a set of options executed by host computer during setup operations.

3. A security system for a host computer as defined in claim 1, wherein the communications port comprises a PS/2 ®-type port.

4. A security system for a host computer as defined in claim 1, wherein the key comprises an electronic key having a second non-volatile memory containing said key ID value.

5. A security system for a host computer as defined in claim 4, wherein said second non-volatile memory operates using a one-wire data communication protocol.

6. A security system for a host computer as defined in claim 5, wherein said second non-volatile memory has only one data line and one ground line.

7. A security system for a host computer, wherein said security system monitors a set of security settings during system boot operations, and wherein the security system controls access to the host computer based upon said security settings, said security system comprising
at least one peripheral device communications port;
a key which is adapted for connection to said at least one peripheral device communications port, said key having an associated key ID value;
a keyboard;
a non-volatile memory having defined therein a stored key ID value, a first password value, and a second password value, said stored key ID value corresponding to said key ID value, said first password corresponding to a first selected access password, and said second password value corresponding to a second selected access password; and
a microprocessor based peripheral controller in communication with said at least one peripheral device communications port, said keyboard, said non-volatile memory and said host computer, wherein said peripheral controller is responsive to entry of said first password on said keyboard or said key being connected to said communications port to permit access to a first set of setup parameters for said computer, and wherein said peripheral controller is responsive to entry of said second password on said keyboard to permit access to a subset of said set of setup parameters.

8. A security system for a host computer as defined in claim 7, wherein the communications port comprises a PS/2 ®-type port.

9. A security system for a host computer as defined in claim 7, wherein the key comprises an electronic key having a second non-volatile memory containing said key ID value.

10. A security system for a host computer as defined in claim 9, wherein said second non-volatile memory operates using a one-wire data communication protocol.

11. A security system for a host computer as defined in claim 10, wherein said second non-volatile memory has only one data line and one ground line.

12. A method of controlling access to a host computer, wherein the host computer is in communication with a peripheral device controller which is in communication with at least one communications port, and wherein said peripheral device controller is further in communication with a non-volatile memory having defined therein a stored key ID value, said method comprising the steps of:
coupling a key having a key ID value corresponding to said stored key ID value to said at least one communications port;
reading, with said peripheral controller, said key ID value from said key;
comparing, with said peripheral controller, said key ID value to said stored key ID value from said non-volatile memory; and
permitting access to said host computer if said peripheral controller determines that said stored key ID value and said key ID value correspond.

13. The method of controlling access to a host computer as defined in claim 12, wherein said non-volatile memory has further defined therein a first password valued corresponding to a first access password, further comprising the steps of:
monitoring, with said peripheral controller, entries made on a keyboard until a predesignated key on said keyboard is pressed;
comparing the entries monitored by said keyboard controller to said first password value to determine is said entries correspond to said first access password; and
permitting access to said host computer if said entries correspond to said first access password.

14. The method of preventing unauthorized access to a host computer as defined in claim 13, wherein said non-volatile memory has further defined therein a second password value corresponding to a second access password, said method further comprising the steps of:
comparing the entries monitored by said keyboard controller to said second password value to determine if said entries correspond to said second access password; and
permitting access to less than all of a set of setup parameters for said host computer if said entries correspond to said second access password.

15. A method of controlling access to a host computer, the host computer in communication with a peripheral controller which is in communication with at least one communications port and with a non-volatile memory, said method comprising the steps of:
initializing a first mode of authorized access, comprising the steps of:
to said host computer by coupling a key having a corresponding key ID value stored therein to said communications port;
with said peripheral controller, reading the key ID value from said key; and
with said peripheral controller, storing a value corresponding to said key ID value in said non-volatile memory as a valid stored key ID, said non-volatile memory inaccessible by said host;
after said initialization, permitting access to said host computer whenever, upon system startup, a key having said key ID value is coupled to said communications port.

16. The method of controlling access to a host computer as defined in claim 15, further comprising the steps of:
   initializing a first password value in said non-volatile memory when said key is coupled to said communications port; and
   after said first password is initialized, permitting access to said host computer whenever said peripheral controller detects entries on said keyboard during system boot which correspond to said first password value initialized in said non-volatile memory.

17. The method of controlling access to a host computer as defined in claim 16, further comprising the steps of:
   initializing a second password by storing a second password value corresponding to said first password in said non-volatile memory when either said key is coupled to said communications port, or said peripheral controller has detected entry of said first password on said keyboard;
   after said second password is initialized, permitting access to less than all of a set of setup parameters for said host computer whenever said peripheral controller detects entries on said keyboard during system boot which correspond to said second password value.

* * * * *

UNITED STATES PATENT AND TRADEMARK OFFICE
CERTIFICATE OF CORRECTION

PATENT NO. : 5,402,492
DATED : March 28, 1995
INVENTOR(S) : Michael K. Goodman, Farzad Noorbechesht and Charles F. Raasch It is certified that error appears in the above-indentified patent and that said Letters Patent is hereby corrected as shown below:

```
In column 27, at line 45, (Claim 7, line 15) insert --value--
before "corresponding".
```

Signed and Sealed this

Fifteenth Day of August, 1995

Attest:

BRUCE LEHMAN

Attesting Officer      Commissioner of Patents and Trademarks